United States Patent
Corio

(10) Patent No.: US 11,533,017 B2
(45) Date of Patent: *Dec. 20, 2022

(54) SPRING COUNTER-BALANCE ASSEMBLIES AND SOLAR TRACKERS INCORPORATING SPRING COUNTER-BALANCE ASSEMBLIES

(71) Applicant: Array Technologies, Inc., Albuquerque, NM (US)

(72) Inventor: Ronald P. Corio, Los Ranchos, NM (US)

(73) Assignee: Array Technologies, Inc., Albuquerque, NM (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/014,848

(22) Filed: Sep. 8, 2020

(65) Prior Publication Data

US 2020/0403561 A1 Dec. 24, 2020

Related U.S. Application Data

(63) Continuation of application No. 15/909,142, filed on Mar. 1, 2018, now Pat. No. 10,771,007.

(Continued)

(51) Int. Cl.
*H02S 20/32* (2014.01)
*F16M 11/12* (2006.01)
(Continued)

(52) U.S. Cl.
CPC ............ *H02S 20/32* (2014.12); *F16M 11/125* (2013.01); *F24S 25/12* (2018.05); *F24S 30/425* (2018.05);
(Continued)

(58) Field of Classification Search
CPC ......... H02S 20/32; F24S 30/425; F24S 25/12; F24S 30/452; F24S 2030/18;
(Continued)

(56) References Cited

U.S. PATENT DOCUMENTS 9,581,678 B2 2/2017 Corio
10,771,007 B2 * 9/2020 Corio .................... F16F 1/3821
(Continued)

FOREIGN PATENT DOCUMENTS

CN 101 293 469 A 10/2008
CN 101293469 A 10/2008
(Continued)

OTHER PUBLICATIONS

European Search Report and Written Opinion for 18760854.2 dated Nov. 24, 2020.
(Continued)

*Primary Examiner* — Kevin K Pyo
*Assistant Examiner* — Don J Williams
(74) *Attorney, Agent, or Firm* — Maschoff Brennan

(57) ABSTRACT

A solar tracker assembly is provided which includes a support column, a torque tube or torsion beam connected to the support column, a mounting mechanism attached to the torque tube or torsion beam, a drive system connected to the torque tube or torsion beam, and a spring counter-balance assembly connected to the torque tube or torsion beam. An exemplary spring counter-balance assembly comprises a bearing housing and a bushing disposed within the bearing housing and configured to be slideably mounted onto the torque tube or torsion beam, and one or more compressible cords made of a flexible material. The compressible cords are located between the bushing and the bearing housing and provide damping during rotational movement of the solar tracker assembly. An exemplary spring counter-balance assembly is provided including at least one top bracket and at least one bottom bracket, at least one spring, a damper, and a bracket. An exemplary spring counter-balance assembly comprises a bearing housing and a bushing disposed within the bearing housing and configured to be slideably (Continued)

mounted onto the torque tube or torsion beam. The spring counter-balance assembly may include at least one coil spring and a rotational stop. The bushing may be made of an elastomeric material and define one or more air spaces.

20 Claims, 22 Drawing Sheets

Related U.S. Application Data

(60) Provisional application No. 62/466,235, filed on Mar. 2, 2017.

(51) Int. Cl.
*F24S 25/12* (2018.01)
*F24S 30/452* (2018.01)
*F24S 30/425* (2018.01)
*F24S 30/00* (2018.01)

(52) U.S. Cl.
CPC ....... *F24S 30/452* (2018.05); *F24S 2030/134* (2018.05); *F24S 2030/136* (2018.05); *F24S 2030/14* (2018.05); *F24S 2030/18* (2018.05); *F24S 2030/19* (2018.05); *Y02E 10/50* (2013.01)

(58) Field of Classification Search
CPC ............. F24S 2030/134; F24S 2030/14; F24S 2030/136; F24S 2030/19; F16M 11/125; Y02E 10/50
See application file for complete search history.

(56) References Cited

U.S. PATENT DOCUMENTS

| | | |
|---|---|---|
| 2010/0051083 A1 | 3/2010 | Boyk |
| 2010/0101630 A1 | 4/2010 | Mikhail |
| 2012/0152316 A1 | 6/2012 | Fischer |
| 2013/0039610 A1 | 2/2013 | Schneider |
| 2014/0230804 A1 | 8/2014 | Siddiqui et al. |
| 2015/0234031 A1 | 8/2015 | Corio |
| 2016/0010789 A1 | 1/2016 | Blitz |
| 2017/0009810 A1 | 1/2017 | Futae et al. |

FOREIGN PATENT DOCUMENTS

| | | |
|---|---|---|
| CN | 101687598 A | 3/2010 |
| CN | 105009446 A | 10/2015 |
| CN | 106062489 A | 10/2016 |
| GB | 2 313 355 A | 11/1997 |
| GB | 2313355 A | 11/1997 |
| JP | H02129410 A | 5/1990 |
| JP | 2001217447 A | 8/2001 |
| JP | 2002227871 A | 8/2002 |
| JP | 2012533892 A | 12/2012 |
| JP | 2015508634 A | 3/2015 |
| KR | 101 356 801 B1 | 2/2014 |
| KR | 101356801 B1 | 2/2014 |
| WO | 2008/046362 A1 | 4/2008 |
| WO | 2008137698 A | 11/2008 |
| WO | 2014/071683 A1 | 5/2014 |

OTHER PUBLICATIONS

International Search Report and Written Opinion, as issued in connection with International Patent Application No. PCT/US2018/020386, dated May 21, 2018, 8 pgs.
U.S. Appl. No. 15/931,301, filed May 13, 2020, titled: Mounting Bracket Extension.
U.S. Appl. No. 17/014,850, filed Sep. 8, 2020, titled: Torsion Limiter Devices, Systems and Methods and Solar Trackers Incorporating Torsion Limiters.
U.S. Appl. No. 17/061,341, filed Oct. 1, 2020, titled: Solar Tracking System.
U.S. Appl. No. 17/061,350, filed Oct. 1, 2020, titled: Solar Tracking During Persistent Cloudy Conditions.
U.S. Appl. No. 17/119,701, filed Dec. 11, 2020, titled: Modified Clamp.
U.S. Appl. No. 17/170,820, filed Feb. 8, 2021, titled: Clip-On Mounting Rails, Mounting Brackets, and Methods of Mounting Solar Modules.
Supplementary European Search Report dated Nov. 24, 2020, in European Patent Application No. 18760854.2.
The European Search Report for App. No. 18760854.2, filed Aug. 28, 2020.
Lin Kongyong, Handbook of Rubber Industry vol. 6: Industrial Rubber Products [M]., p. 393 394, Chemical Industry Press, 1993. 06.
C.H. Kozhevnikov et al., M echanism (vol. 2), p. 348 3 49 , Mechanical Industry Press, 1981. 0 3.

* cited by examiner

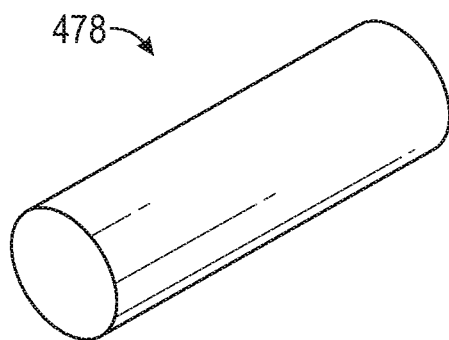
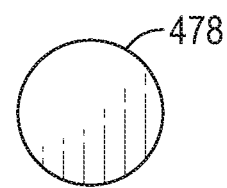
FIG. 17A    FIG. 17B
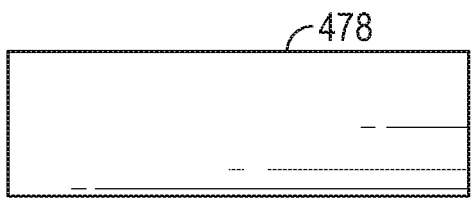
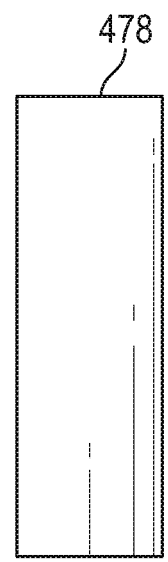
FIG. 17C    FIG. 17D

SPRING COUNTER-BALANCE ASSEMBLIES AND SOLAR TRACKERS INCORPORATING SPRING COUNTER-BALANCE ASSEMBLIES

CROSS-REFERENCE TO RELATED APPLICATIONS

This application is a continuation of U.S. patent application Ser. No. 15/909,142 filed Mar. 1, 2018, now U.S. Pat. No. 10,771,007, issued Sep. 8, 2020, which claims priority to and the benefit of U.S. Provisional patent application Ser. No. 62/466,235, filed on Mar. 2, 2017, each of which is hereby incorporated by reference in its entirety.

BACKGROUND

Field

The present disclosure relates to spring counter-balance assemblies. The present disclosure further relates to spring assemblies used to balance the rotation of solar trackers and solar arrays

Description

Solar tracking systems are employed in photovoltaic and solar thermal applications to increase the collection of sunlight by aiming the photovoltaic panels or collectors at the sun throughout sun's daily movement in the sky. In doing so, tracking systems incorporate pivot points or bearings on which to rotate. These bearings may be placed at the center of gravity of the tracking system or may be located underneath the photovoltaic or collector array.

The array balancing approach, the technique of placing the bearing housings at or near the center of gravity of the array, has the benefit of alleviating the stress on the positioning drive apparatus because there is little or no overhung weight to create an inherent moment load on the positioning system. Furthermore, balancing the mechanical system about the center of gravity also reduces or eliminates the torsion deflection of the supporting structure, which may allow for less structure material requirements.

To counterbalance with a pivot point positioned at or near the center of gravity of a tracking system, most designs must locate the pivot points above the surface of the photovoltaic modules or thermal collectors. This creates complexity in the structure, in the bearing pivot points, and creates density inefficiencies because there must be spaces in the collection surface where the bearings are located. The spaces where the center of gravity bearings are located are commonly referred to as dead space in the system because solar collection is not possible at these areas of the system. When used in a large photovoltaic solar farm or thermal collector, these dead spaces in the North/South length of the tracker row get multiplied by the East/West spacing that is required between the trackers and result in considerable density reduction across an entire field.

Accordingly, there is a need for an improved system for balancing the rotation of a tracking system. There also is a need for an improved balancing system that eliminates dead spaces in the system. There is a need for an improved balancing system that is less complex, requires less structural material, and results in lower torsional deflection in the system.

SUMMARY

Exemplary embodiments of the present disclosure alleviate to a great extent the disadvantages of known balancing systems for solar trackers by incorporating spring elements in the solar tracker to counterbalance the mechanical rotation instead of center of gravity pivot points. This provides the advantage of keeping the pivot bearings and structure uncomplicated and requires no dead spaces in the system which results in all the benefits of a balanced structure without the penalty of dead spaces and fielded density inefficiencies. These benefits include low complexity, less stress on the mechanical drive system, less structural material and less torsional deflection of the system and less stress on the bearings themselves since they are located around the circumference of the torque transmitting structural member. More particularly, benefits include lower complexity in the bearings and structure relative to the balanced center of gravity bearing system plus the attributes of the balanced CG system such as less stress on the mechanical drive system, less structural material and less torsional deflection of the system and elimination of the collector dead spaces to achieve high density.

Exemplary embodiments of a solar tracker assembly comprise a support column, a torque tube or torsion beam connected to the support column, a mounting mechanism attached to the torque tube or torsion beam, a drive system connected to the torque tube or torsion beam, and a spring counter-balance assembly connected to the torque tube or torsion beam. One or more types of spring counter-balance assembly may be incorporated into the solar tracker assembly to balance its rotation.

Exemplary embodiments of a spring counter-balance assembly include at least one top bracket and at least one bottom bracket, at least one spring, a damper, and a bracket. The spring has a first end and second end. The first end of the spring is attached to the top bracket, and the second end of the spring is attached to the bottom bracket. The damper has a first end and a second end. The first end of the damper is attached to the top bracket, and the second end of the damper is attached to the bottom bracket such that the damper is positioned substantially parallel to the spring. The bracket is attached to the top bracket and is sized and shaped for a torque tube or torsion beam to be inserted through the bracket such that the spring counter-balance assembly can be incorporated into a solar tracker.

In exemplary embodiments, the spring is selected from the group consisting of: a drawbar spring, an extension spring, and a leaf spring. The spring may be incorporated into a damper, a damper bracket assembly, or a bearing housing. In exemplary embodiments, the solar tracker assembly is incorporated into a row of solar trackers wherein the spring counter-balance assembly comprises a first spring counter-balance assembly connected to the torque tube or torsion beam at or near a first end of the row and incorporating a first spring and a second spring counter-balance connected to the torque tube or torsion beam at or near a second end of the row and incorporating a second spring.

In exemplary embodiments, a solar tracker assembly comprises a support column, a torque tube or torsion beam connected to the support column, a mounting mechanism attached to the torque tube or torsion beam, a drive system connected to the torque tube or torsion beam, and a spring connected to the torque tube or torsion beam. One or more solar modules may be mounted on the mounting mechanism. The spring may be a drawbar spring, an extension spring and/or a leaf spring.

In exemplary embodiments, the solar tracker assembly further comprises a damper bracket assembly attached to the torque tube or torsion beam, and the spring is incorporated into the damper bracket assembly. In exemplary embodiments, the solar tracker assembly further comprises at least one damper attached to the torque tube or torsion beam, and the spring is incorporated into the damper. The solar tracker assembly may have at least one bearing housing attaching the torque tube or torsion beam to the support column, and the spring may be located at the bearing housing. In exemplary embodiments, the spring is incorporated into the bearing housing. The solar tracker assembly may further comprise a torque limiter assembly.

In exemplary embodiments, the solar tracker assembly further comprises a spring counter-balance assembly including at least one top bracket and at least one bottom bracket, at least one spring, a damper, and a bracket mounting means. The spring has a first end and second end. The first end of the spring is attached to the top bracket, and the second end of the spring is attached to the bottom bracket. The damper has a first end and a second end. The first end of the damper is attached to the top bracket, and the second end of the damper is attached to the bottom bracket such that the damper is positioned substantially parallel to the spring. The bracket is attached to the top bracket and such that torque tube or torsion beam is inserted through the bracket to connect the spring counter-balance assembly to the torque tube or torsion beam.

Exemplary embodiments of a solar array comprise at least one tracker row. Each tracker row includes at least one support column, at least one torque tube or torsion beam connected to the support column, a mounting mechanism attached to the torque tube or torsion beam, a drive system connected to the torque tube or torsion beam, a first spring connected to the torque tube or torsion beam at or near a first end of the row, and a second spring connected to the torque tube or torsion beam at or near a second end of the row, where the second end is opposite the first end. One or more solar modules may be mounted on the mounting mechanisms of the solar array. The spring may be a drawbar spring, an extension spring and/or a leaf spring.

In exemplary embodiments, the solar array further comprises a damper bracket assembly attached to the torque tube or torsion beam, and the spring is incorporated into the damper bracket assembly. In exemplary embodiments, the solar array further comprises at least one damper attached to the torque tube or torsion beam, and the spring is incorporated into the damper. The solar array may have at least one bearing housing attaching the torque tube or torsion beam to the support column, and the spring may be located at the bearing housing. In exemplary embodiments, the spring is incorporated into the bearing housing. The solar array may further comprise a torque limiter assembly.

The solar array may have a first spring counter-balance assembly connected to the torque tube or torsion beam at or near the first end of the row and incorporating the first spring and a second spring counter-balance connected to the torque tube or torsion beam at or near the second end of the row and incorporating the second spring. Each spring counter-balance assembly comprises at least one top bracket and at least one bottom bracket, at least one spring, a damper, and a bracket. The spring has a first end and second end. The first end of the spring is attached to the top bracket, and the second end of the spring is attached to the bottom bracket. The damper has a first end and a second end. The first end of the damper is attached to the top bracket, and the second end of the damper is attached to the bottom bracket such that the damper is positioned substantially parallel to the spring. The bracket is attached to the top bracket and such that torque tube or torsion beam is inserted through the bracket to connect the spring counter-balance assembly to the torque tube or torsion beam.

In exemplary embodiments, the spring counter-balance assembly comprises an eccentric compression bushing configured to be slideably mounted onto the torque tube or torsion beam, a shaped outer bearing housing configured to be mounted over the eccentric compression bushing, and or more compressible cords made of an elastomeric material. The eccentric compression bushing and the shaped outer bearing housing and may provide damping during rotational movement of the solar tracker assembly. The flexible material of the compressible cords may be rubber or another elastomer. In exemplary embodiments, the bushing has an octagonal inner surface with one or more substantially flat surfaces, and the bearing housing hays one or more lobes such that one or more spaces are defined between the substantially flat surfaces and the lobes. The compressible cords may be disposed in the spaces between the substantially flat surfaces and the lobes.

In exemplary embodiments, the bushing has an octagonal inner cross-section and a substantially circular outer cross-section with four lobes. The bearing housing may be substantially square shaped, and the spring counter-balance assembly allows up to at least plus or minus 45 degrees of rotation of the torque tube or torsion beam. In exemplary embodiments, the bushing has an octagonal inner cross-section and a substantially triangular outer cross-section with three lobes, and the spring counter-balance assembly allows up to at least plus or minus 60 degrees of rotation of the torque tube or torsion beam. The outer bearing housing is one of: substantially square shaped, substantially hexagonal, and substantially circular with three lobes.

Exemplary embodiments of a spring counter-balance assembly include a bearing housing having one or more lobes, a bushing disposed within the bearing housing such that one or more spaces are defined between the bushing and the lobes, and one or more compressible cords made of a flexible material. The compressible cords are disposed in the spaces between the bushing and the lobes.

In exemplary embodiments, the spring counter-balance assembly comprises a bearing housing and a bushing disposed within the bearing housing and configured to be slideably mounted onto the torque tube or torsion beam. The spring counter-balance assembly may further comprise at least one coil spring and a rotational stop. The bushing may be made of an elastomeric material and define one or more air spaces. In exemplary embodiments, the spring counter-balance assembly further comprises at least one rotational stop. The bearing housing may be made of an elastomeric material and further comprise at least one rotational stop.

Accordingly, it is seen that spring counter-balance assemblies and balancing systems for solar trackers and solar arrays are provided. The disclosed assemblies, systems, and methods provide improved balancing systems that eliminate dead spaces, reduce complexity, require less structural material, minimize drive forces, and result in lower torsional deflection. These and other features and advantages will be appreciated from review of the following detailed description, along with the accompanying figures in which like reference numbers refer to like parts throughout.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 17A is a perspective view of an exemplary embodiment of a compressible cord of a spring counter-balance assembly in accordance with the present disclosure;

FIG. 17B is a front cross-sectional view of the compressible cord of FIG. 17A;

FIG. 17C is a side view of the compressible cord of FIG. 17A;

FIG. 17D is a top view of the compressible cord of FIG. 17A;

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
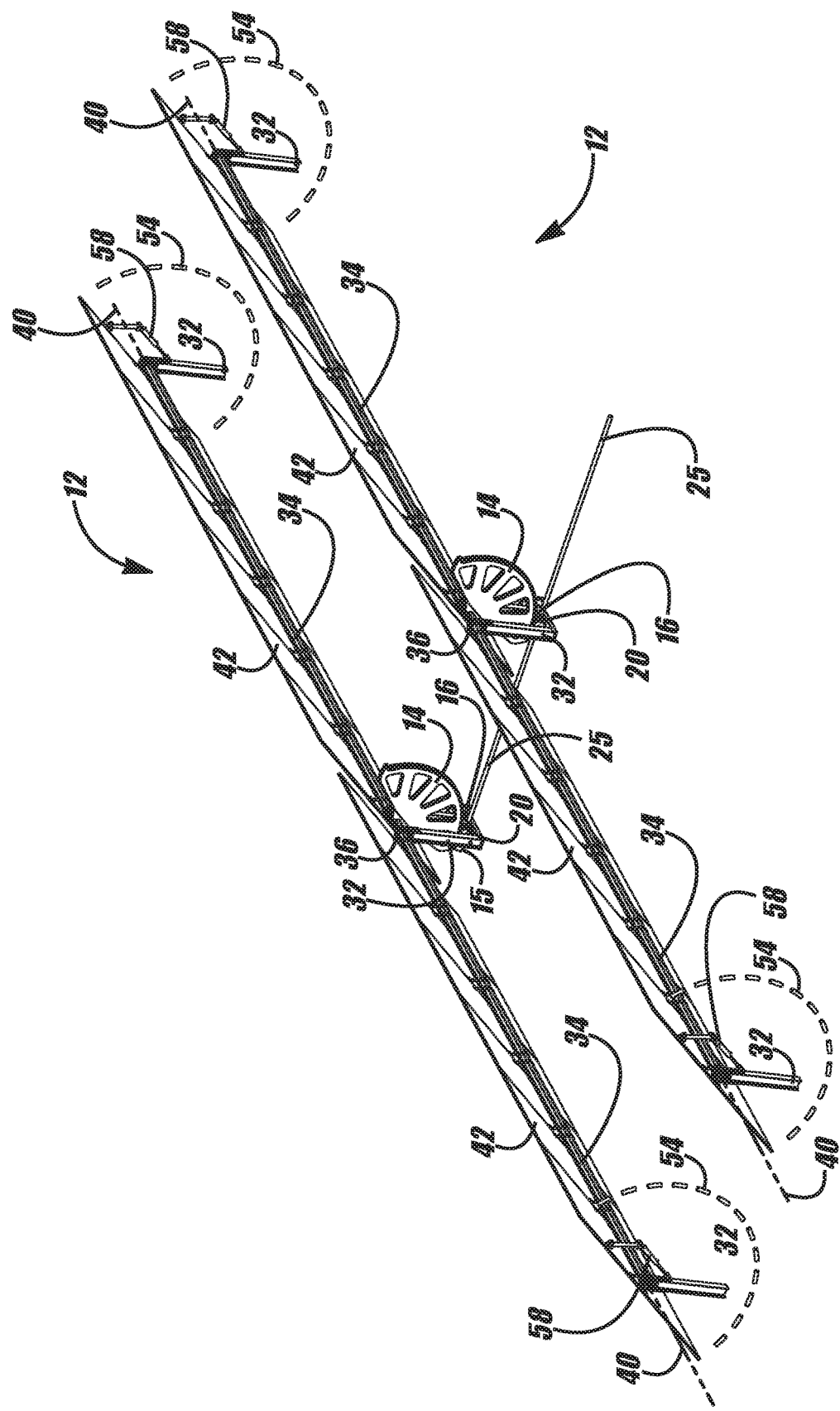
FIG. 1 is a perspective view of an exemplary embodiment of a solar tracker assembly in accordance with the present disclosure.

Solar trackers incorporating one or more spring counter-balance assemblies will now be described. The spring counter-balance assemblies described herein are designed to allow a large degree of rotation and counterbalance the overhung weight of the collectors mounted to the torque tube or torque beam assembly. As shown in FIG. 1, an exemplary solar tracker assembly 12 comprises at least one support column 32, which may be any shape and composed of any material so long as it is capable of supporting the PV modules or collectors mounted thereto. Exemplary embodiments of a solar tracker assembly 12 include two spaced-apart support columns 32. A torque tube or torsion beam 34 or other tracker structure is connected to the support column. More particularly, the torsion beam 34 bridges the two support columns and may be attached to the support columns 32 by a bearing housing 36 and bearing housing arrangement including any suitable fasteners.

The torque tube or torsion beam 34 may be any shape or configuration suitable for supporting a mounting rack or other mounting mechanism, including multiple connected beams, and in exemplary embodiments it has a circular-, square- or hexagonal-shaped cross section. It should be noted that the torque tube or torsion beam 34 could be any cross-sectional shape including but not limited to circular, rounded, ovular, square, rectangular, triangular, pentagonal, hexagonal, and octagonal. In a system that has overhung weight, the overhung load torque varies as the system rotates.

A pivot axis 40 extends through the torque tube or torsion beam 34, which may pivot or rotate about the pivot axis 40. Solar modules 42 may be mounted to the solar tracker 12, either mounted on the torque tube or torsion beam 34 using clamps or mounting brackets 35 or on the mounting rack via a module mounting bracket assembly or other mounting device. It should be noted that solar trackers could employ more than one torque tube or torsion beam in a double- or multiple-beam torsion structure arrangement. In such embodiments, a tracker would have two or more torsion beams running along its length. A row of multiple trackers could have two or more torsion beams running along the length of the row.

A mounting rack (not shown) is attached to the torque tube or torsion beam 34. In exemplary embodiments, the mounting rack includes a front frame support and rear frame support (not shown). The front frame support is disposed upon a first side of the torque tube or torsion beam, and the rear frame support is disposed upon a second opposite side of the torque tube or torsion beam.

The solar tracker 12 may have a gear-driven mechanical system which includes a gear rack 14. The mechanical system may also include a gear drive system 16 that incorporates a torque limiter 18 such as a torque limiting clutch. A motor 15 may be provided to drive the gear drive system 16, which in turn rotates the torsion beam or torque tube 34 directly, or drives a gear rack 14, which in turn drives the torque tube or torsion beam 34 or another module mounting beam structure. The gear rack 14 may be a spur gear rack or D-ring chain drive, which is affixed to the rotatable torque tube or torsion beam of the tracker. Thus, when activated by gear drive system, the tracker is rotated. A second, third, etc. mechanical unit, similar to tracking assembly 12 can be connected to drive shaft 25 with a separate and similar worm assembly. This can be repeated for several mechanical units in a gear-driven mechanical system.

Exemplary solar tracker assemblies 12 may further comprise one or more dampers 58 incorporated at or near the gear rack to control the release of torsional force and slow the motion of the solar tracker assembly. The dampers 58 may serve double duty as stops at the end of the array, or dampers placed at any location may be designed to assist in regulating the torsional release reaction speed and resisting the hinge moment loads. In exemplary embodiments, a spring is integrated into at least one of the dampers. An additional bracket may be provided which allows a damper 58 to be connected between the torsion tube 34 and the support column 32 of the tracker 12. A damper 58 may be incorporated at the gear drive to control the rate at which the tracker rotates during an over torque release event. When the torsion is relieved by allowing the system to rotate, the speed at which the array is allowed to move may be controlled by the slip friction of the clutch, or by an external damper or both. A spring may be incorporated into one or more of the damper brackets.

Figure 2A:
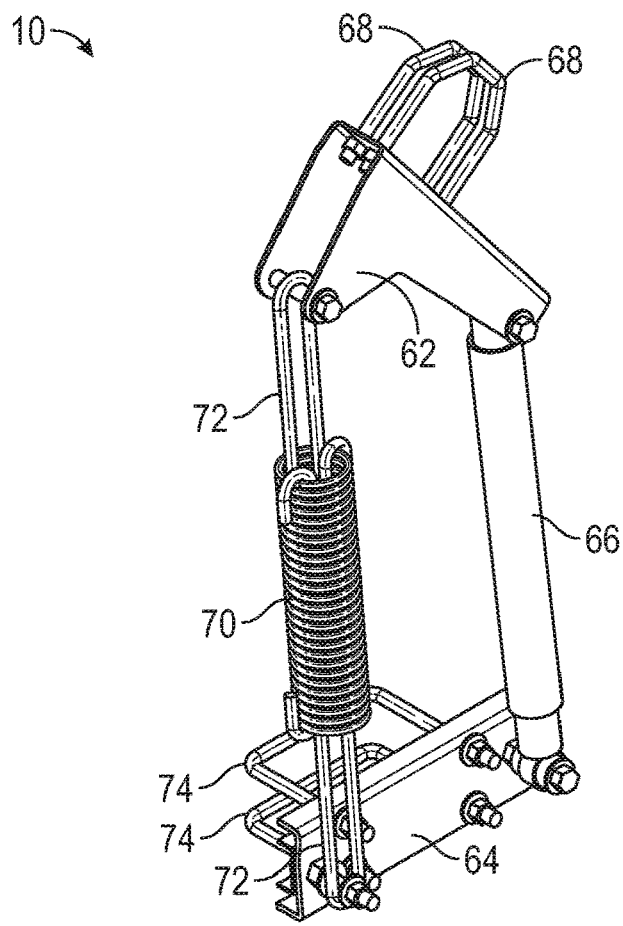
FIG. 2A is a perspective view of an exemplary embodiment of a spring counter-balance assembly in accordance with the present disclosure.
Figure 2B:
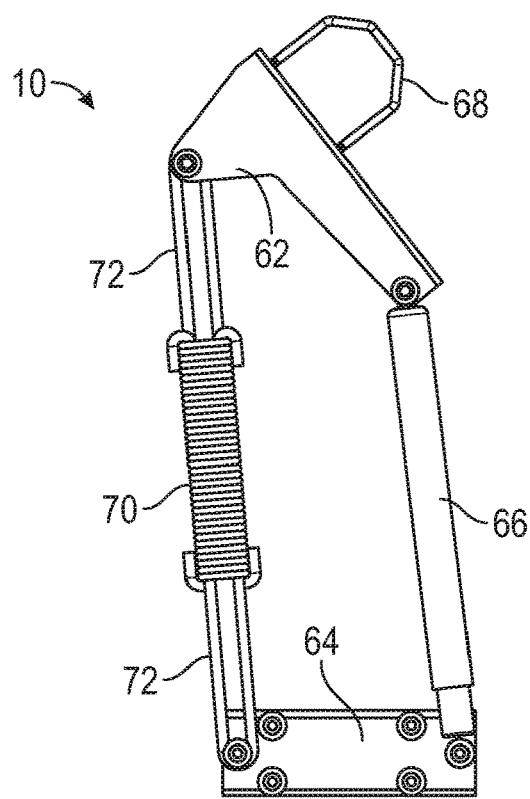
FIG. 2B is a side view of the spring counter-balance assembly of FIG. 2A.
Figure 3:
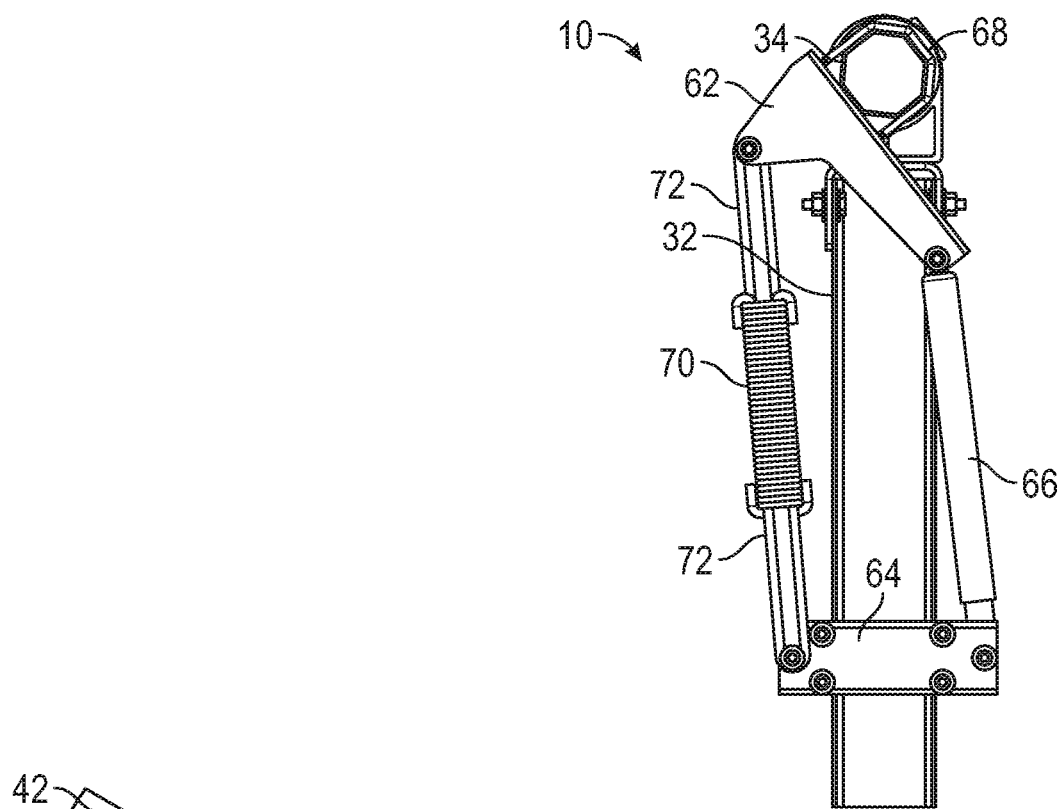
FIG. 3 is a side view of an exemplary embodiment of a spring counter-balance assembly in accordance with the present disclosure shown mounted on a torque tube or torsion beam.

With reference to FIGS. 2A-9, exemplary embodiments of spring counter-balance assemblies 10 and 10a will now be described. Exemplary embodiments of a spring counter-balance assembly include a top bracket 62, a bottom bracket 64, a damper 66, a bracket 68, and a spring 70, which may be a drawbar spring, an extension spring, a leaf spring, or any other suitable type of spring. The spring 70 is located between the top bracket 62 and the bottom bracket 64. More particularly, the first end of the spring 70 is directly or indirectly attached to the top bracket, and the second end of the spring 70 is directly or indirectly attached to the bottom bracket 64. As best seen in FIGS. 2A and 2B, spring holders 72 may be used to link the spring 70 to the top and bottom brackets 62, 64. Alternatively, as best seen in FIGS. 5A and 5B, the spring 70 of spring counter-balance assembly 10a may be directly connected to the top and bottom brackets 62, 64.

In exemplary embodiments, damper 66 is positioned substantially parallel to the spring 70. More particularly, the first end of the damper 66 is attached to the top bracket 62, and the second end of the damper 66 is attached to the bottom bracket 62. In exemplary embodiments, a bracket 68 is attached to the top bracket 62 and is sized and shaped for a torque tube or torsion beam 34 to be inserted through the bracket. This configuration of the bracket provides for quick and easy attachment to torque tube or torsion beam and incorporation of the spring counter-balance assembly into a solar tracker. It should be noted that more than one bracket 68 could be used, and exemplary embodiments employ two or more brackets 68 for mounting the spring counter-balance assembly to the torque tube or torsion beam 34. Counter-balance springs and dampers may also be mounted by separate brackets onto the support columns in the same or different locations with similar effectiveness (not shown).

Figure 4:
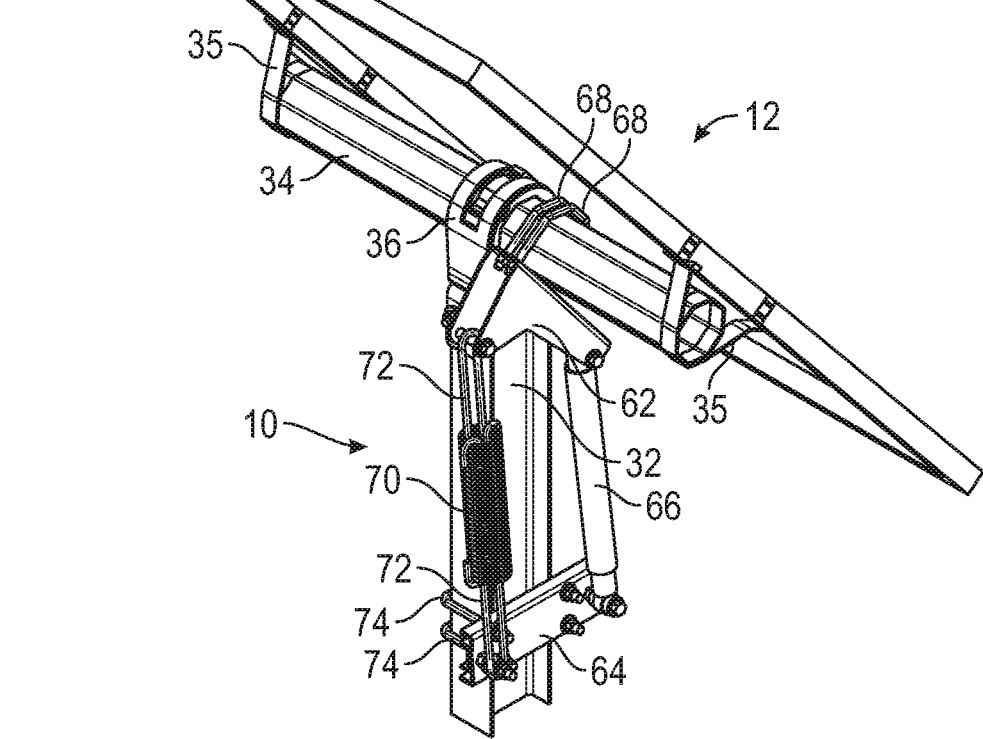
FIG. 4 is a perspective view of an exemplary embodiment of a spring counter-balance assembly in accordance with the present disclosure shown mounted on solar tracker assembly.
Figure 5A:
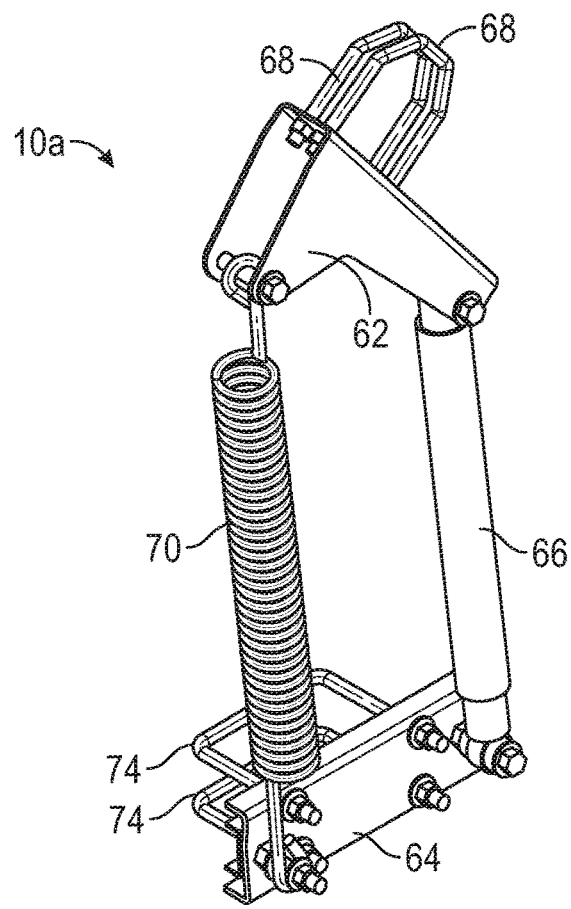
FIG. 5A is a perspective view of an exemplary embodiment of an extension spring counter-balance assembly in accordance with the present disclosure.
Figure 5B:
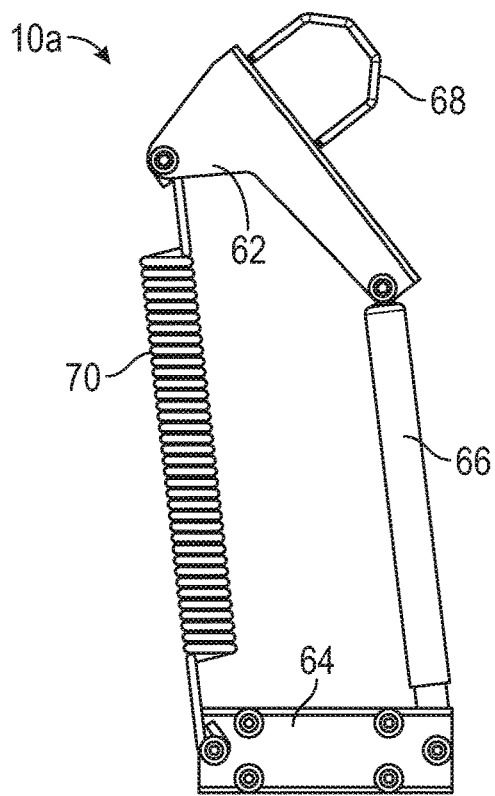
FIG. 5B is a side view of the extension spring counter-balance assembly of FIG. 5A.
Figure 6:
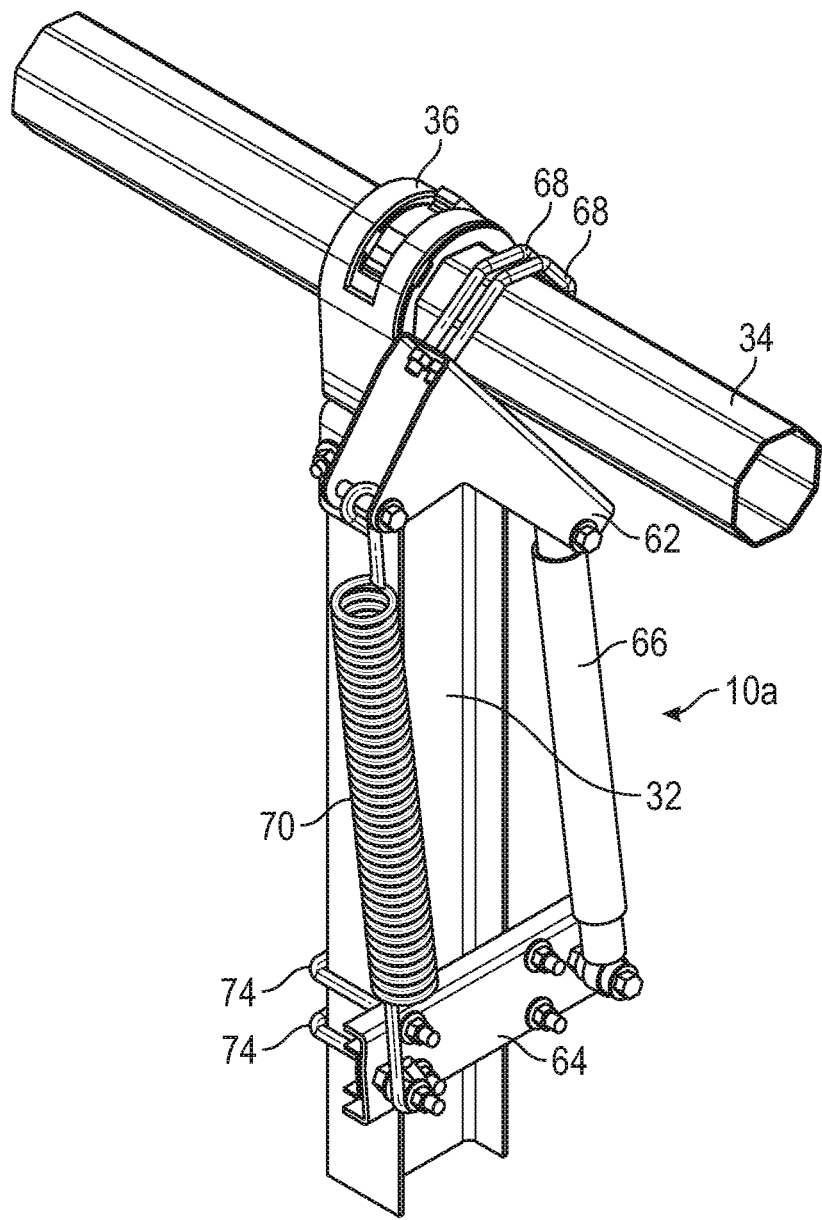
FIG. 6 is a perspective view of an exemplary embodiment of an extension spring counter-balance assembly in accordance with the present disclosure shown mounted on a torque tube or torsion beam.
Figure 7:
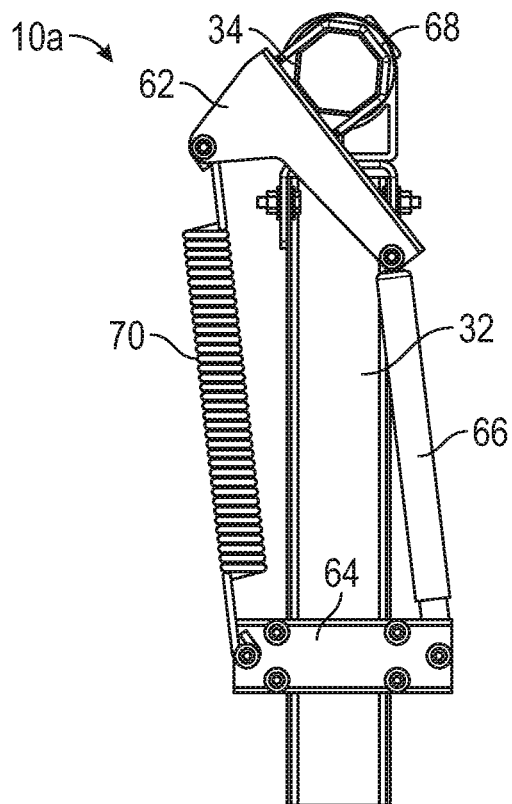
FIG. 7 is a side view of an exemplary embodiment of an extension spring counter-balance assembly in accordance with the present disclosure shown mounted on a torque tube or torsion beam.
Figure 8:
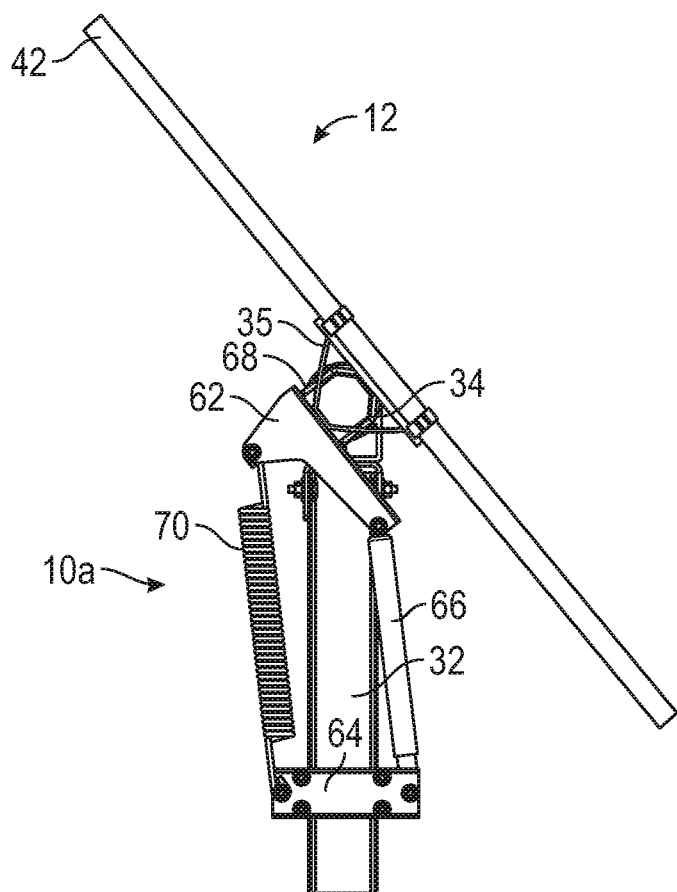
FIG. 8 is a side view of an exemplary embodiment of an extension spring counter-balance assembly in accordance with the present disclosure shown mounted on solar tracker assembly.
Figure 9:
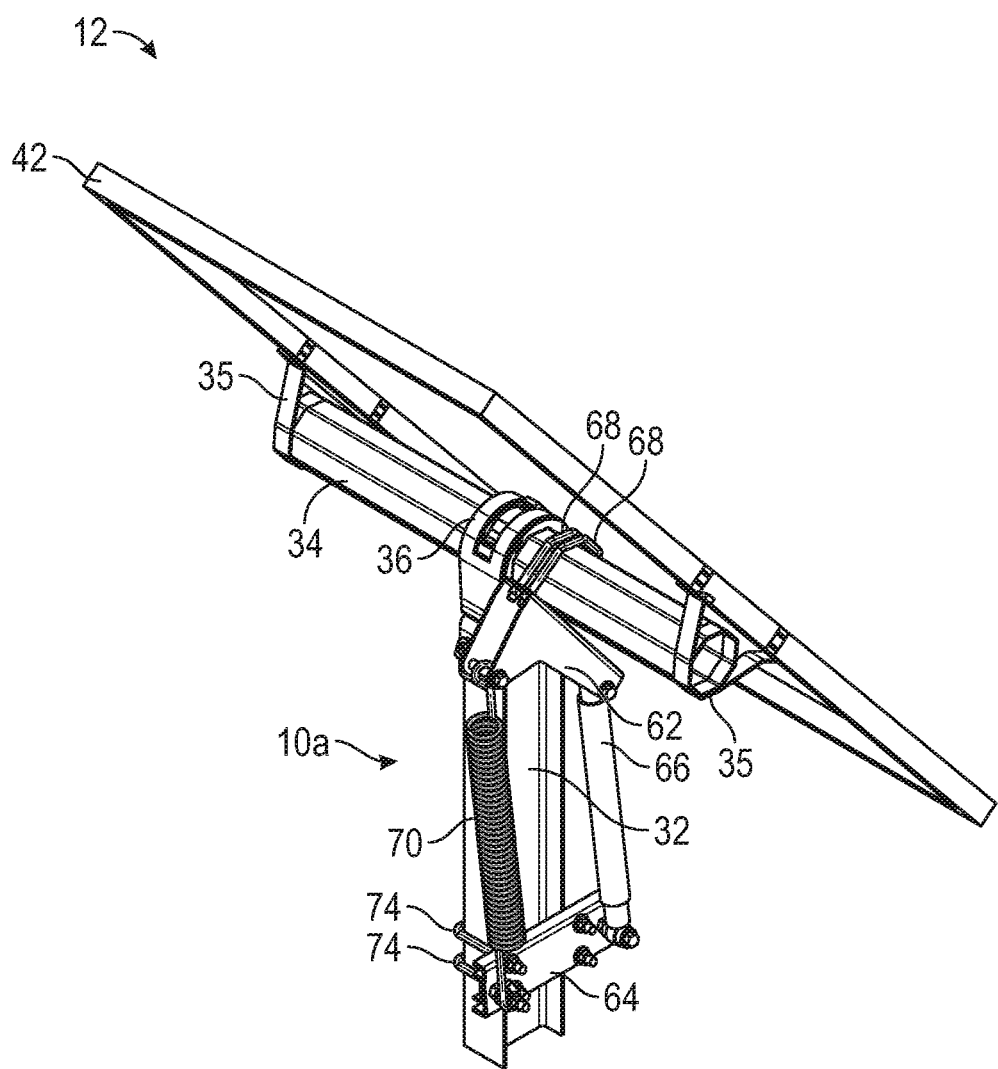
FIG. 9 is a perspective view of an exemplary embodiment of an extension spring counter-balance assembly in accordance with the present disclosure shown mounted on solar tracker assembly.

As shown in FIGS. 3-4 and 6-9, an extension spring counter-balance assembly 10 or 10a may be incorporated into a solar tracker by attachment of the spring counter-balance assembly to the torque tube or torsion beam of the tracker. As mentioned above, the spring counter-balance assembly 10 is connected to the solar tracker via one or more brackets 68 on the top frame of the assembly. More particularly, because the bracket is sized and shaped to fit onto the torque tube or torsion beam, it can slide onto the torque tube or torsion beam (or the tube or beam inserted though the opening of the bracket) to attach the spring counter-balance assembly to the tracker. As best seen in FIGS. 4, 6 and 9, the spring counter-balance assembly also may be secured to the support column at one or more locations using lower brackets 74. More particularly, the top frame may include a pin, threaded fastener, or other type of fastener to attach it to a top portion of the support column and/or the bottom frame may have one or more additional lower brackets 74 that fit around the support column and attaches it thereto at a location at or near the bottom of the support column.

In exemplary embodiments, a counter-balance assembly 10 or 10*a* may be incorporated into a solar array comprising one or more rows of solar trackers. The solar array may include individually motorized trackers without mechanical linkages between the rows. The array may include a plurality of rows of solar trackers comprised of multiple rows of linked solar trackers. More particularly, multiple solar trackers may be mechanically linked in a large array configuration so they may operate in unison, driven by a single motor and tracker controller. In exemplary embodiments, one spring is connected to the torque tube or torsion beam at or near the first end of the tracker row, and another spring is connected to the torque tube or torsion beam at or near the second end of the row. As discussed above, each spring may be incorporated into a spring counter-balance assembly or into a damper or bearing housing assembly.

Exemplary embodiments include a configuration in which two drawbar springs are placed toward the ends of the tracker row. The drawbar springs may be incorporated into the damper bracket assembly or located separately from the dampers with a separate bracket. Exemplary embodiments include a configuration in which two compression drawbar springs are placed toward the ends of the tracker row. The compression drawbar springs may be incorporated into the damper bracket assembly or located separately from the dampers with a separate bracket. Exemplary embodiments include a configuration in which two leaf springs are placed toward the ends of the tracker row (not shown). The leaf springs may be incorporated into the damper bracket assembly or located separately from the dampers with a separate bracket. In exemplary embodiments, smaller drawbar, extension or leaf springs may be located at each bearing housing. Springs also could be integrated into the stop blocks of the bearing housings. Exemplary trackers may include torsional spring pivot points that integral to the bearing housings and/or torsional spring pivot points that are not integral to the bearing housings but counterbalance movement.

Solar trackers incorporating the non-elastomeric spring counter-balance assembly embodiments described above typically will have inherent damping mechanisms. Dampers and their use in solar trackers are described in detail in U.S. Pat. No. 9,581,678, issued Feb. 28, 2017, which is hereby incorporated by reference in its entirety. As best seen in FIG. 1, exemplary solar trackers may comprise a damper incorporated at or near the gear rack to control the release of torsional force and slow the motion of the solar tracker assembly. A damper may be incorporated at the gear drive to control the rate at which the tracker rotates during an over torque event. The max angle stop may then be resisted not only by the gear rack, but by the dampers at the gear rack or stops at the end of the rows of solar trackers 12, thereby sharing the torsion load of the gear rack 60 and distributing the torsion load through multiple points on the torsion tube 34. The dampers 58 may serve double duty as stops at the end of the array, or dampers placed at any location may be designed to assist in regulating the torsional release reaction speed and resisting the hinge moment loads.

Figure 10:
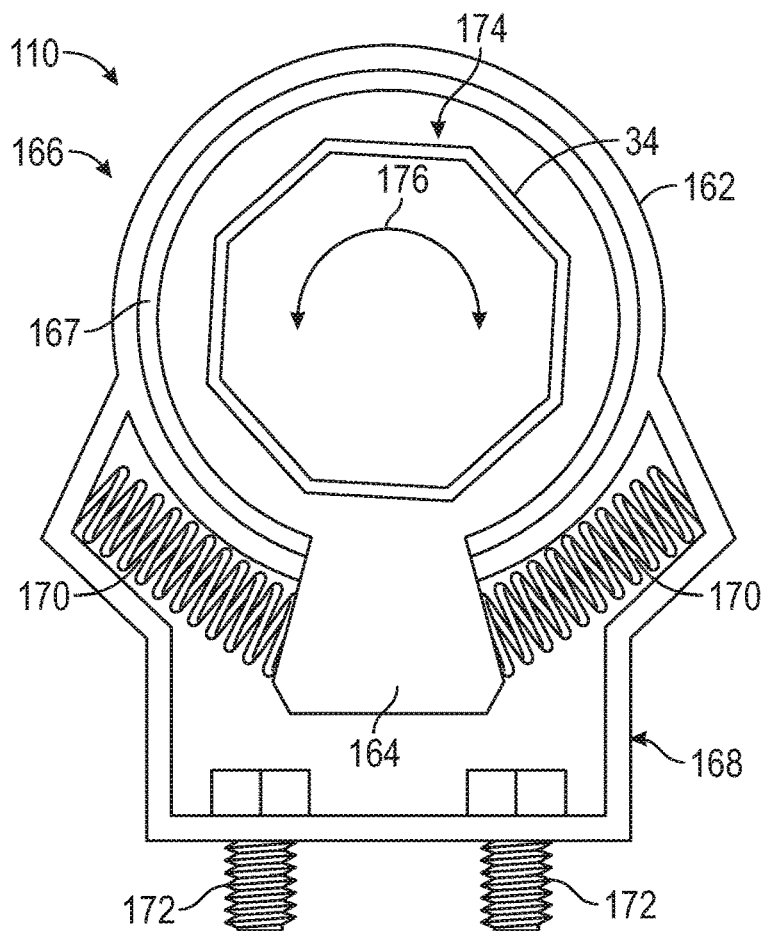
FIG. 10 is a cross-sectional view of an exemplary embodiment of an integrated spring counter-balance bearing assembly in accordance with the present disclosure.

Turning now to FIG. 10, an exemplary embodiment of an integrated spring counter-balance assembly employing discrete coil springs and a rotational stop will now be described. Spring counter-balance assembly 110 does not provide inherent damping, and an additional damper may be required to control speed of movement or oscillation. Spring counter-balance assembly 110, shown in cross-section, has a housing 162 including an upper rounded section 166 which is slid onto a torque tube or torsion beam of a solar tracker and a lower section 168. An inner layer 174 of aluminum or other suitable structural material is disposed within the top section 166 of the housing 162, and there is a circular polymer bearing material layer 167 between top section 166 and inner layer 174. The inner surface of the inner layer 174 is sized and shaped to fit over a torque tube or torsion beam of a solar tracker. In exemplary embodiments, the inner surface of the inner layer 174 has an octagonal cross-section, and the outer surface has a substantially circular cross section.

The lower section 168 of the housing 162 contains two coil springs 170, a stop block 164 and has a bottom surface for incorporating mounting bolts 172 or other fastening mechanisms. More particularly, the stop block 164 is located in the center of the spring counter-balance assembly 110 directly below the below the inner layer 174. The stop block 164 is flanked on each side by coil springs 170, with one coil spring 170 adjacent to the right side of the stop block 164 and the other coil spring 170 adjacent to the left side of the stop block 164. This double spring and stop design of spring counter-balance assembly 110 advantageously limits rotation of a torque tube or torsion beam along its angle of rotation 176 in two ways. Each coil spring 170 provides rotational resistance, and depending on the direction of the rotation, either the coil spring on the right side or the coil spring on the left side can bottom out in compression. Also, when the torque tube or torsion beam rotates, rotation may be limited when the stop block 164 hits the side of the lower section 168 of the housing 162 of the spring counter-balance assembly 110.

Figure 11:
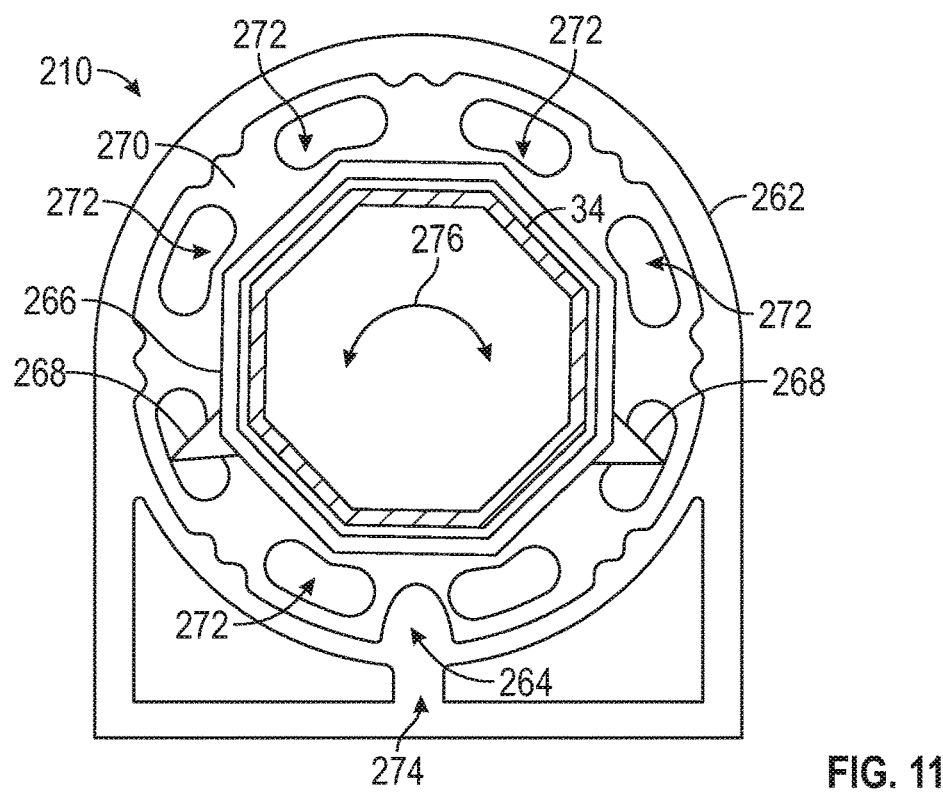
FIG. 11 is a cross-sectional view of an exemplary embodiment of an integrated spring counter-balance bearing assembly in accordance with the present disclosure.

FIG. 11 illustrates an exemplary embodiment of a spring counter-balance assembly with a radial elastic bushing. This embodiment may also provide inherent damping due to the elastomers lack of spring hysteresis. Spring counter-balance assembly 210 comprises a housing 262 that has a stop 264 as part of the internal structure of the housing itself. In exemplary embodiments, the housing 262 is made of aluminum, cast iron, or another suitable structural material. Disposed within the housing 262 is a substantially round intermediate layer 270 composed of an elastic polymer material. The intermediate polymer layer 270 defines one or more air spaces 272 disposed within it. In exemplary embodiments, there are a plurality of air spaces 272 spaced apart and extending around the circumference of the intermediate layer 270. A coupler 266, which may be a metal tube cast in elastomer, is disposed adjacent the inner surface of the intermediate layer 270. The coupler 266 is sized and shaped to be slid over a torque tube or torsion beam of a solar tracker and, in exemplary embodiments, has an octagonal cross-section.

In exemplary embodiments, housing 262 is substantially circular with extending sides and a substantially flat base. It is designed to have a stop 264 at the bottom of the circular portion housing the intermediate layer 270 and the metal tube 266. Housing 262 also has a center rib 274 in its base portion located directly below the stop 264. Exemplary embodiments include at least one rotational stop 268 on the coupler 266. A rotational stop 268 may be located at each of the bottom corners of each lateral side of the coupler 266. Housing 262 advantageously rotates without any sliding surfaces. Rather, as a torque tube or torsion beam rotates about its angle of rotation 276 (also 54, shown in FIG. 1), the spring counter-balance assembly 210 flexes in the intermediate elastomer layer and provides rotational spring force. When the torque tube or torsion beam rotates to its limit, one of the rotational stop 268 on the coupler 266 hits the stop 264 of the housing 262. The elastomer between the metal stops acts a soft stop for rotation.

Figure 12:
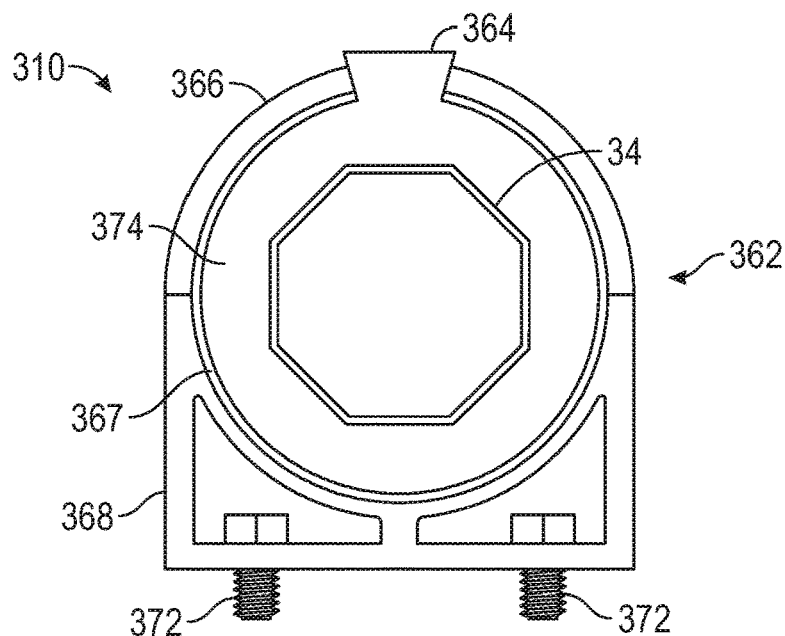
FIG. 12 is a side view of an exemplary embodiment of an integrated torsional spring counter-balance bearing assembly in accordance with the present disclosure.
Figure 13A:
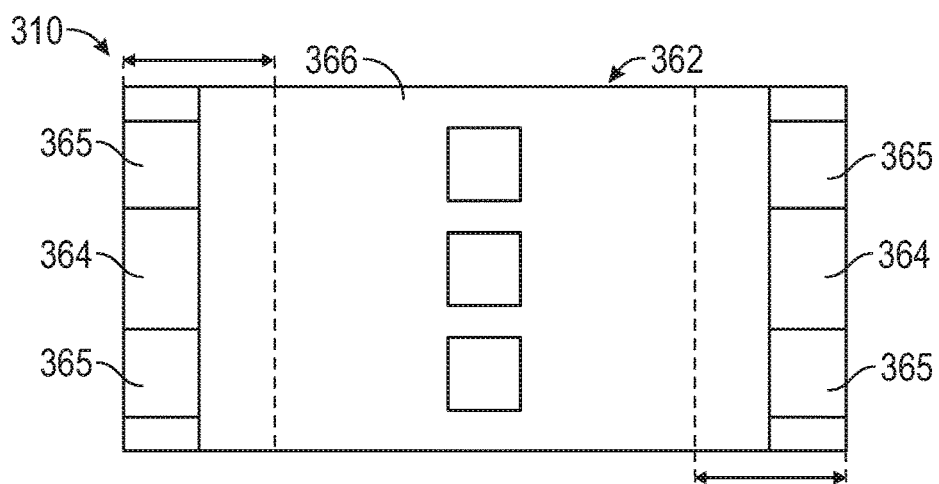
FIG. 13A is a top view of an exemplary embodiment of a bearing housing of a spring counter-balance assembly in accordance with the present disclosure.
Figure 13B:
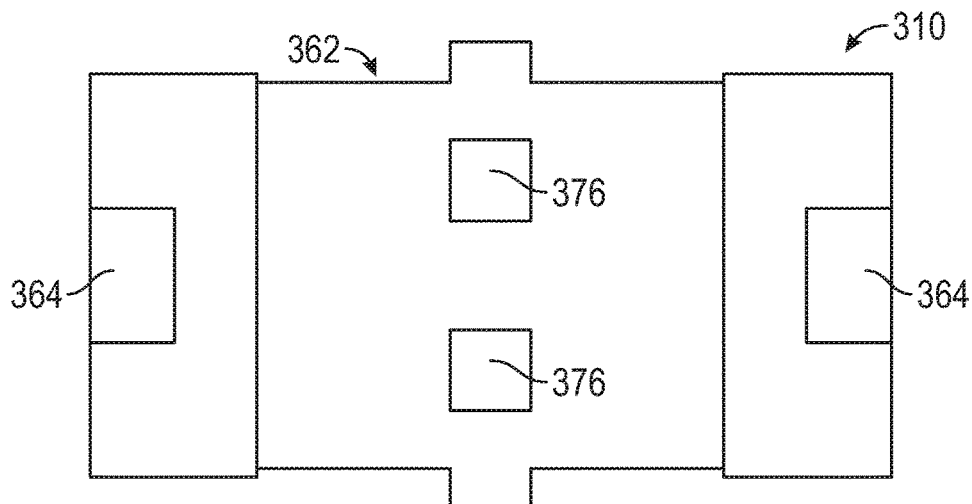
FIG. 13B is a side view of an exemplary embodiment of the torsional spring bearing insert of FIG. 13A in accordance with the present disclosure.

With reference to FIGS. 12, 13A and 13B, a spring counter-balance assembly with an integral longitudinal elastomer torsion spring and surface bearings which provides inherent damping will now be described. Spring counter-balance assembly 310 comprises a bearing housing 362 and an inner elastomer tube 374 bonded to two octagonal shaped metal or plastic inserts at each end of the elastomer tube 374 rotating on a polymer bearing layer 367 inside the bearing housing 362. An exemplary bearing housing 362 includes an upper rounded section 366 and a lower section 368 that has a bottom surface for incorporating mounting bolts 372 or other fastening mechanisms. The housing 362 is made of aluminum, cast iron, engineered polymer or other suitable structural material. The upper and lower sections 366, 368 are connected, and the full housing 362 forms a circular interior. Circular bearing layers 367 is disposed at the ends of the interior of the housing 362 and is made of a polymer bearing material. The inner elastomer torsion tube 34 has an outer surface with a substantially circular cross-section mating to a circular polymer bearing material 367 and an inner surface sized and bonded to two shaped inserts at each end to be slid onto and rotationally keyed to a torque tube or torsion beam 34. In exemplary embodiments, the inner surface has an octagonal cross-section.

The elastomer torsion tube layer 374 has at least one integrally formed protrusion that keys to the bearing housing 362. In exemplary embodiments, the torsion tube 34 is held fixed to the bearing housing 362 at the center while each end is keyed to the torque tube or torque beam. In this embodiment, the torsion tube twists the elastomer torsion spring 374 relative to the bearing housing creating a counterbalance rotational force as it turns in either direction. The elastomer torsion tube 374 is anchored into the housing 362 by anti-rotation tabs 376 that interlock into holes in the upper section 366 of the housing 362. Rotational stops 364 engage the bearing housing 362 at notches 365 when the desired rotational angle limit is achieved. The design of spring counter-balance assembly 310 advantageously minimizes the diameter of the assembly by configuring the torsion spring layer 374 parallel to the axis of rotation. More particularly, the stops 364 and the bearing ends of surface of the inner structural layer 374 is located at the ends of the housing 362 and keyed to the shape of torque tube or torsion beam at those ends. The keyed ends are molded to an elastomer tube, which is connected to the housing 362 at the center.

Turning now to FIGS. 14A-17D, spring counter-balance assemblies which provide counter-balance spring force and inherent damping will now be described. As discussed in detail herein, spring counter-balance assembly 410 incorporates one or more compressible cords 478 to provide both rotational counter-balance spring force and damping capability. In exemplary embodiments, the compressible cords 478 are made of a flexible material, which may be an elastomeric material such as rubber. The lack of hysteresis of the rubber or other elastomeric material provides natural damping, in some cases obviating the need to employ a damper. The compressible cords are incorporated into an assembly having a substantially square bearing housing and a substantially rounded bushing. The assembly 410 is designed to allow a large degree of rotation and counterbalance heavy objects such as solar trackers mounting solar modules. More particularly, the square design allows rotational movement up to plus or minus approximately 48 degrees of rotation.

The assembly 410 includes bushing 470, which is sized and shaped such that it can be slid onto a torque tube or torsion beam, or so a torque tube or torsion beam can be slid through the bushing 470. The inner surface 472 of the bushing 470 can be any suitable shape to correspond to the cross-sectional shape of the torque tube or torsion beam. In exemplary embodiments, the inner surface 472 of the bushing 470 has an octagonal shape and the outer surface 480 is substantially round with four lobes 486 to compress the compressible cords 478 as it rotates. Spring counter-balance assembly 410 also includes bearing housing 476. The bushing 470 is disposed within the bearing housing 476 and compressible cords 478 situated between bushing 470 and bearing housing 476. Bearing housing 476 can be any suitable shape, and in exemplary embodiments is substantially square-shaped with four rounded corners.

Figure 14A:
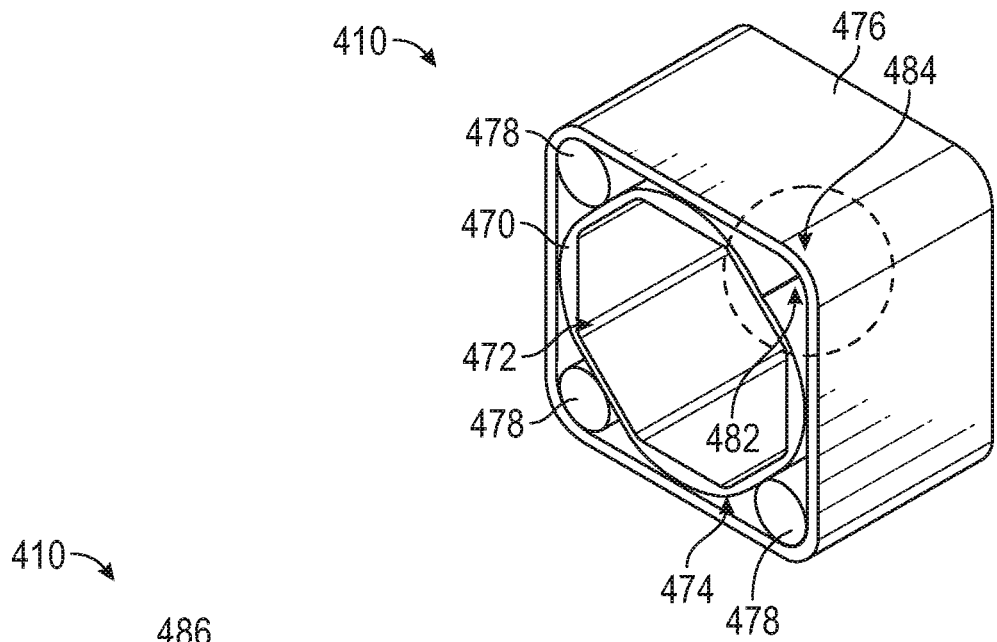
FIG. 14A is a perspective view of an exemplary embodiment of an integrated spring counter-balance bearing assembly in accordance with the present disclosure.
Figure 14B:
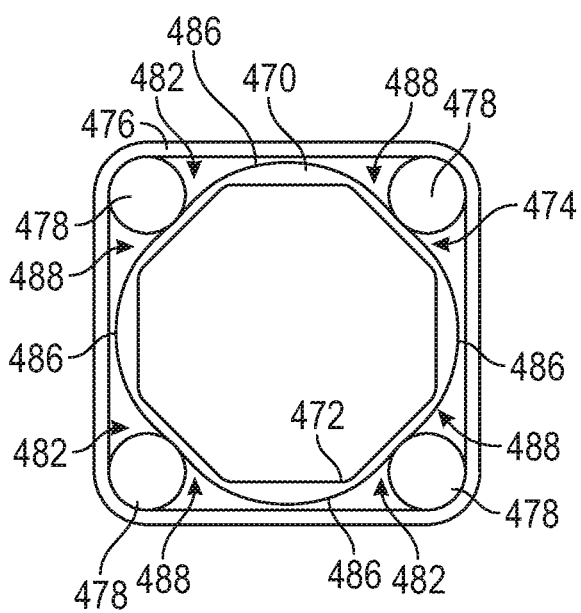
FIG. 14B is a front cross-sectional view of the integrated spring counter-balance bearing assembly of FIG. 14A.
Figure 14C:
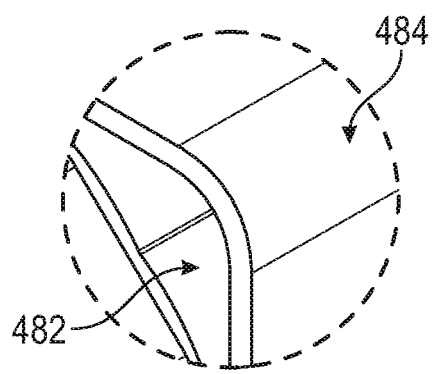
FIG. 14C is a detail view of a corner of the integrated spring counter-balance bearing assembly elastomer space of FIG. 14A.
Figure 15A:
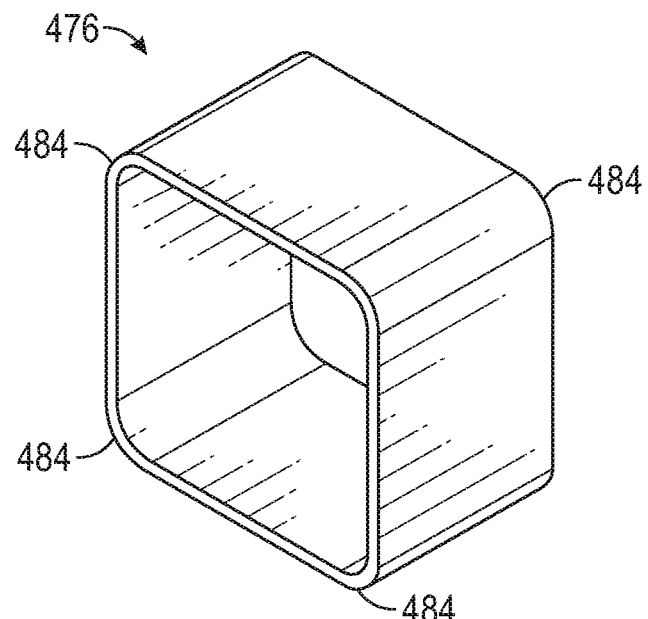
FIG. 15A is a perspective view of an exemplary embodiment of a bearing housing of a spring counter-balance assembly in accordance with the present disclosure.
Figure 15B:
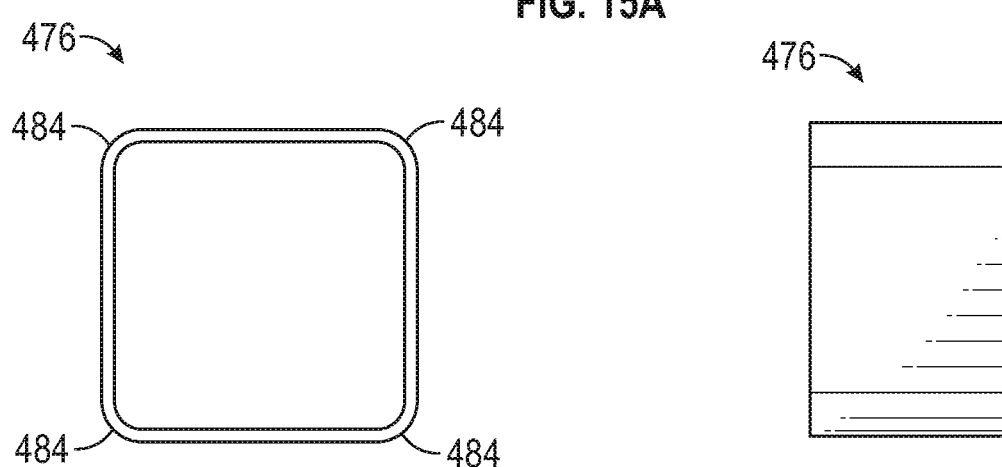
FIG. 15B is a front view of the bearing housing of FIG. 15A.
Figure 15C:
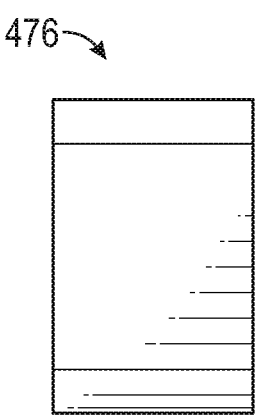
FIG. 15C is a side view of the bearing housing of FIG. 15A.
Figure 15D:
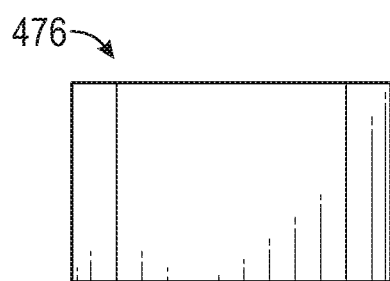
FIG. 15D is a top view of the bushing of the bearing assembly of FIG. 14A.

In exemplary embodiments, bushing 470 is disposed within bearing housing 476 along with four compressible cords 478, each compressible cord being located adjacent a corner 484 of the bearing housing 476. More particularly, as best seen in FIGS. 14A and 14B, when bushing 470 is disposed with bearing housing 476 there are four spaces 482 defined between the outer surface 480 of the bushing and the inner surface of the rounded corners 484 of the bearing housing. Each compressible cord 478 is located in a space 482 such that the compressible cords are securely disposed between the bushing 470 and the bearing housing 476. The generally rounded four lobes of the outer surface 480 of bushing 470 may have flat sections 488 situated to correspond with spaces 482 such that the compressible cords 478 rest on the flat sections of the bushing.

Figure 16A:
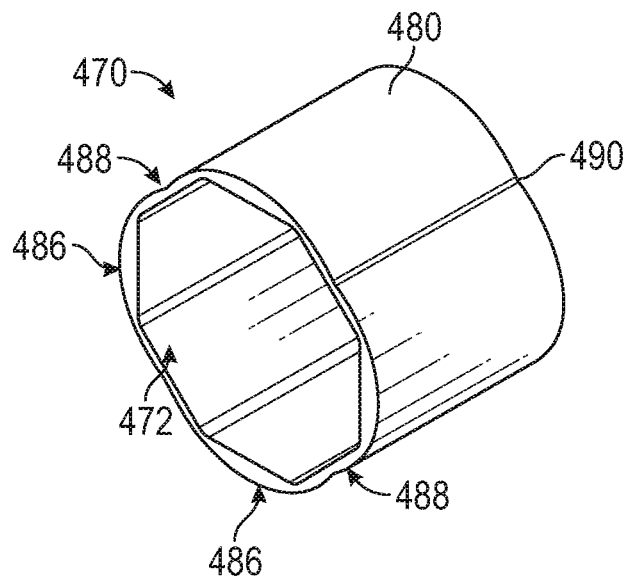
FIG. 16A is a perspective view of an exemplary embodiment of a bushing of a spring counter-balance assembly in accordance with the present disclosure.
Figure 16B:
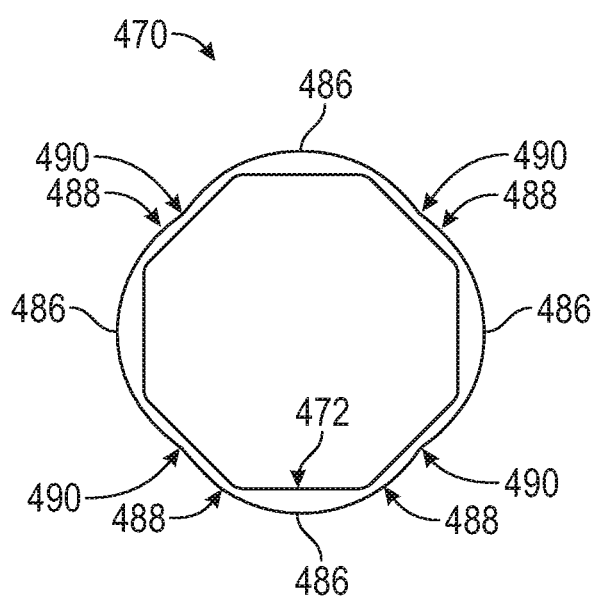
FIG. 16B is a front cross-sectional view of the bushing of FIG. 16A.

As best seen in FIG. 16B, in exemplary embodiments, bushing 470 has a relatively thinner cross-section at each flat section 488 than a relatively thicker cross section at the more lobes 486 of the bushing, and the outer surface 480 of the bushing alternates between flat sections 488 and more rounded sections, or lobes 486. The thinner cross sections are designed to accommodate the compressible cords 478 at the flat sections 488 of the bushing 470. As best seen in FIGS. 16A and 16B, each flat section 488 of the bushing 470 may define a transition 490 from one lobe 486 to an adjacent lobe 486.

As the bushing 470 rotates, the compressible cords 478 both roll and compress to provide a counterbalance rotational spring force. This force is a function of the durometer (hardness) of the elastomer and the shape relationship of the bushing 470 and bearing housing 476 that entraps the compressible cords 478. In this embodiment, the spring bearing is designed to counteract the overhung rotational weight of the devices mounted on the torque tube or torsion beam. The overhung weight is a sine function of the rotational angle, weight and the distance of the weight from the center of rotation. It is therefore advantageous to design the spring force profile of the elastomer spring bearing assembly to provide a resistance profile as close to a sine function of the rotational angle which corresponds to the amplitude of the torque as a result of the moment forces generated by the collectors mounted on the torque tube or torsion beam.

Spring counter-balance assembly 410 advantageously allows up to + or −48 degrees of rotation and benefits from a small outside envelope and four compressible cords. Applications requiring + or −48 degrees of rotation may benefit from this design due to its small radius from the center rotating point which minimizes the overhung weight and the sharing of the spring and damper loads with four compressible cords.

As shown in FIGS. 18A-22, another exemplary embodiment of a spring counter-balance assembly 510 provides inherent damping by incorporating compressible cords 576 in a circular tri-lobed bearing housing and a modified Reuleaux triangular bushing 570. In some applications, up to + or −63 degrees of rotation are required, which assembly 510 can facilitate.

When the torque tube or torsion beam 34 of the solar tracker assembly 12 rotates, the damper cords 578 compress as the bushing 570 rotates about angle of rotation 592 and the bearing housing 576 remains in a fixed position. More particularly, when the bushing 570 rotates and the three lobed sections 586 of the bushing shift in position against a stationary bearing 576, each damper cord 578 is compressed between the inner wall of the bearing housing 576 and the lobed surface 586 of the bushing 570 as the space 582 diminishes in size due to the changed position of each lobed section 586. As the compressible cords 578 reach their maximum compressibility, they provide rotational spring force and damping upon compression release due to the lack of hysteresis of the elastomeric material. The compressible cords 578 may be made of a flexible material, which may be an elastomeric material such as rubber. The inherent lack of hysteresis of the rubber or other elastomeric material provides natural damping, obviating the need to employ a damper. The assembly 510 is designed to allow a large degree of rotation and counterbalance the overhung moment loads from objects such as solar trackers mounting solar modules.

Spring counter-balance assembly 510 includes bushing 570, which is sized and shaped such that it can be slid onto a torque tube or torsion beam, or so a torque tube or torsion beam can be slid through it. In exemplary embodiments, the inner surface 572 of the bushing 570 has an octagonal shape. Bushing 570 has a substantially triangular cross-section, and the outer surface 580 has three predominantly flat sections 588 constituting the sides of the triangle and three rounded sections, or lobes 586 constituting the angles of the triangle. Bearing housing 576 has a substantially hexagonal cross-section with six flat side sections 574 and six angled corners 584. The bearing housing 576 may be designed such that the corners are not all equal in their angles. In an exemplary embodiment, the bottom corner has a smaller angle than the top corner.

Figure 18A:
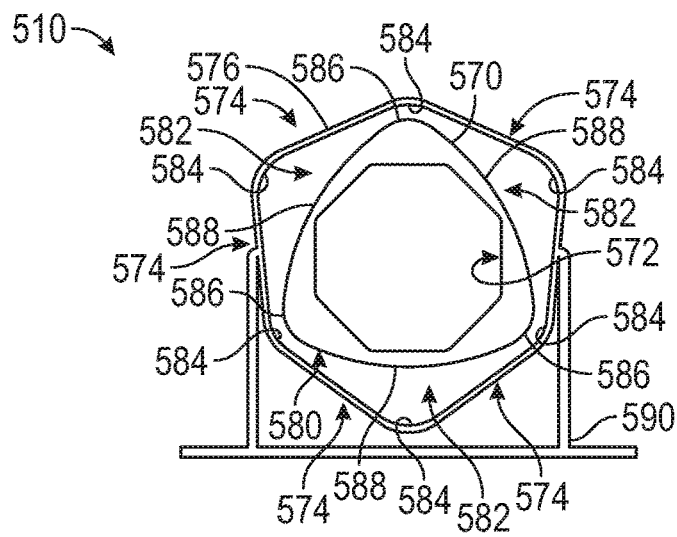
FIG. 18A is a front cross-sectional view of an exemplary embodiment of a spring counter-balance assembly in accordance with the present disclosure shown without the compressible cords.
Figure 18B:
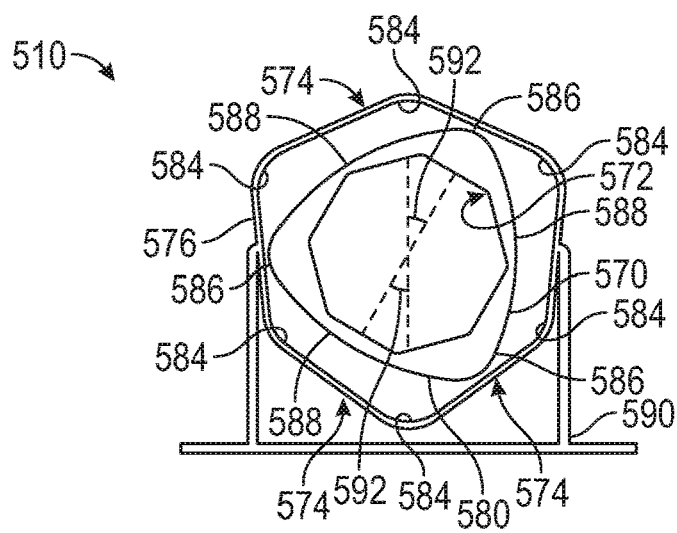
FIG. 18B is a front cross-sectional view of the spring counter-balance assembly of FIG. 18A shown in rotation.
Figure 18C:
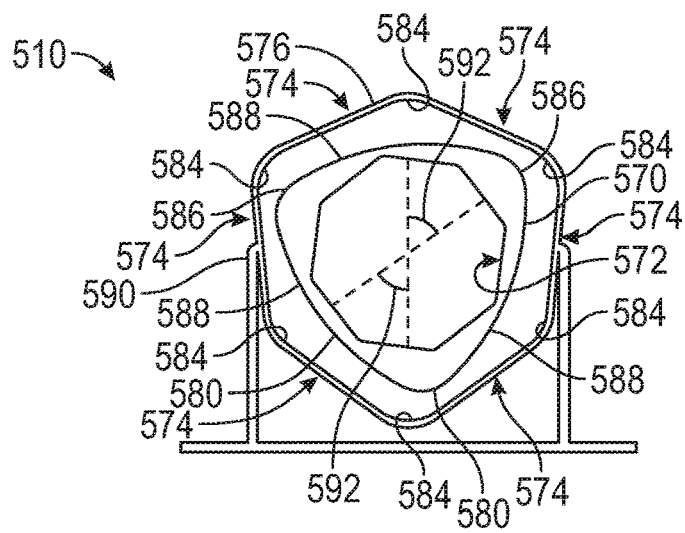
FIG. 18C is a front cross-sectional view of the spring counter-balance assembly of FIG. 18A shown in rotation.
Figure 19:
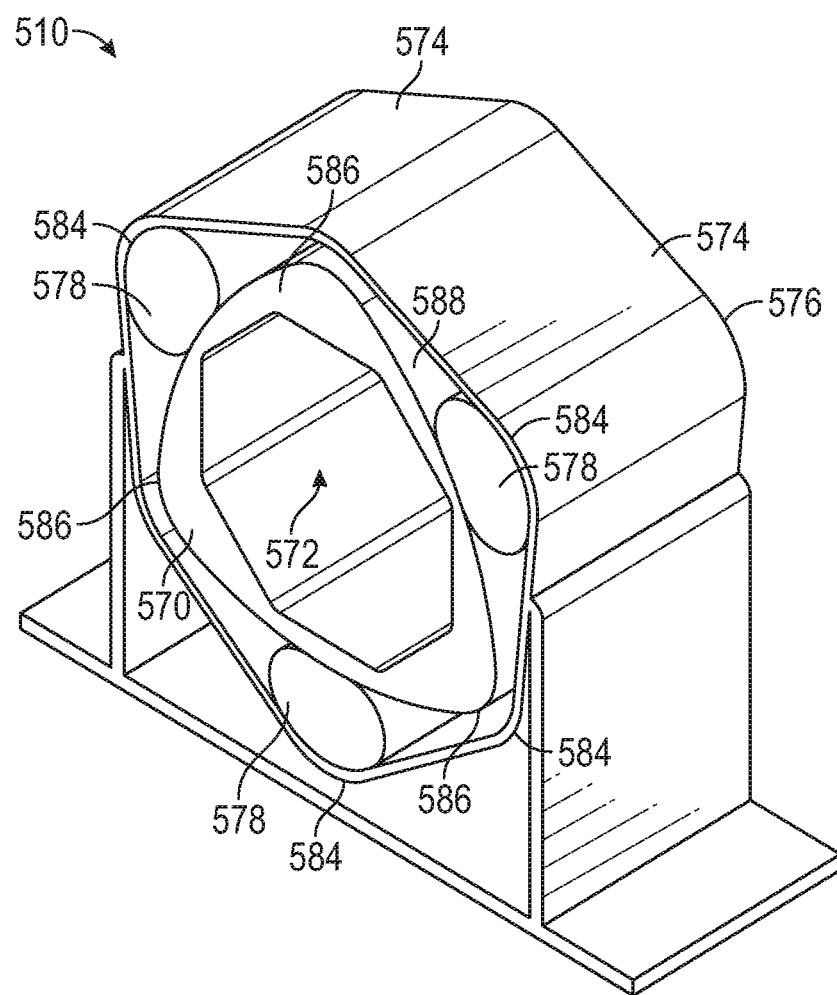
FIG. 19 is a perspective view of an exemplary embodiment of a spring counter-balance assembly in accordance with the present disclosure.

In exemplary embodiments, bushing 570 is disposed within the bearing housing 576 such that each of the lobes 586 of the bushing 570 is located adjacent one of three alternating internal angled corners 584 of the bearing housing 576. As best seen in FIG. 18A, in this configuration of the assembly 510, each flat section 588 of the bushing 570 is located facing one of the other three alternating internal angled corners 584 of the bearing housing 576 such that a space 582 is defined between each flat section 588 and each internal angled corner 548.

Bushing 570 could be used with another embodiment of bearing housing 676 shown in FIGS. 23A-25. In this variation of the spring counter-balance assembly 510*a*, the bearing housing 676 is substantially circular with three lobes 686, and the bushing 570 disposed within the bearing housing 676 such that each of the three predominantly flat section 588 of the bushing 570 is located facing one of the lobes 686 such that a space 582 is defined between each flat section 588 and each lobe 686. Incorporating a generally round bearing housing with three lobes entraps the compressible cords better than the hexagonal design at the large rotational angles.

As the bushing 570 rotates, the compressible cords 578 both roll and compress into a smaller space which results in a counterbalancing spring force. Since the overhung weight of the apparatus mounted on the torque tube or torsion beam 34 creates a moment force about the center of the rotation axis, the spring design is optimally constructed to equally counteract the moment force created by the apparatus as it rotates. The counterbalance force is a moment force about a centroid and therefore is a sine function of the angle of rotation. The moment force created by the overhung weight of the apparatus equals sin*angle*weight*distance from centroid. This describes a sine function with amplitude. To design the corresponding equal counterbalance force, the shape of resulting rotational spring force should be a sine function and to derive the desired amplitude is a result of the compression of the compressible cords during rotation and their corresponding resistance to compression, otherwise known as their hardness measured as durometer. The durometer of the elastomer, its characteristics as it compresses and the geometric shape relationship of the bushing and bearing housing that entraps the compressible cords are the variables that interrelate to achieve the desired counterbalance amplitude to approximate a sine function moment force resistance curve.

Figure 20A:
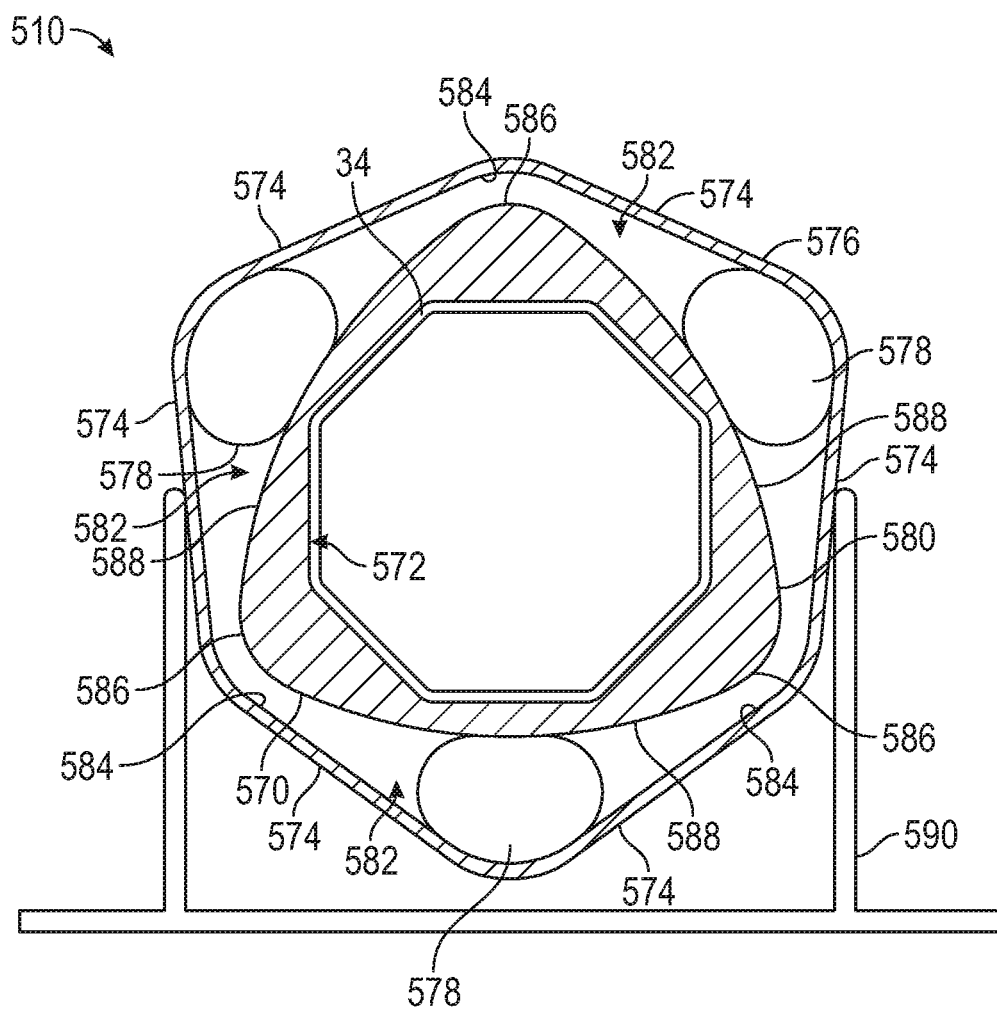
FIG. 20A is a front cross-sectional view of an exemplary embodiment of a spring counter-balance assembly in accordance with the present disclosure.
Figure 20B:
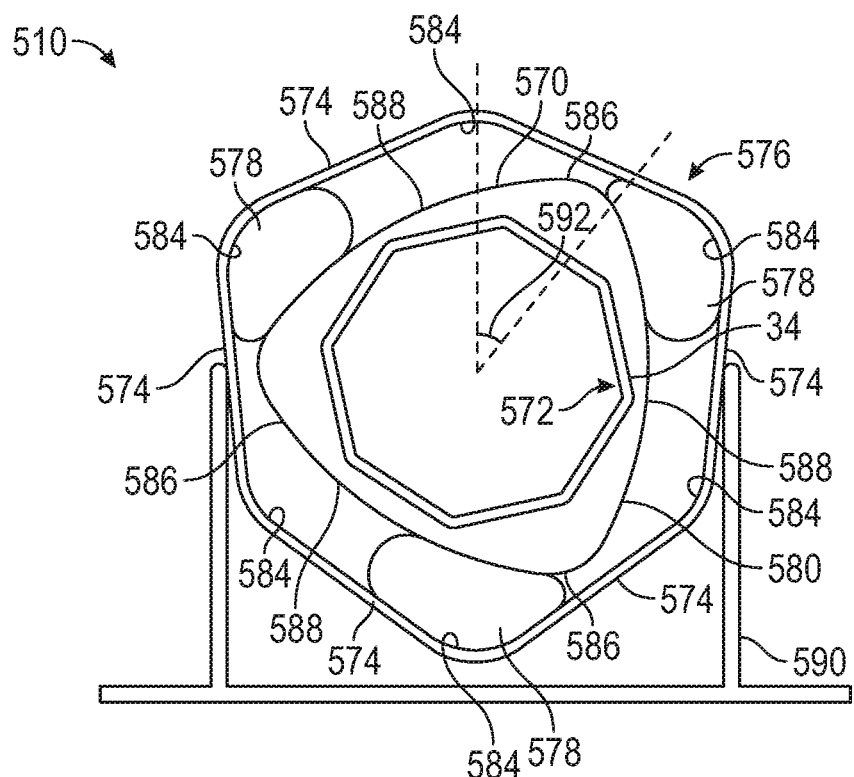
FIG. 20B is a front cross-sectional view of the spring counter-balance assembly of FIG. 20A shown in 30-degree rotation.
Figure 20C:
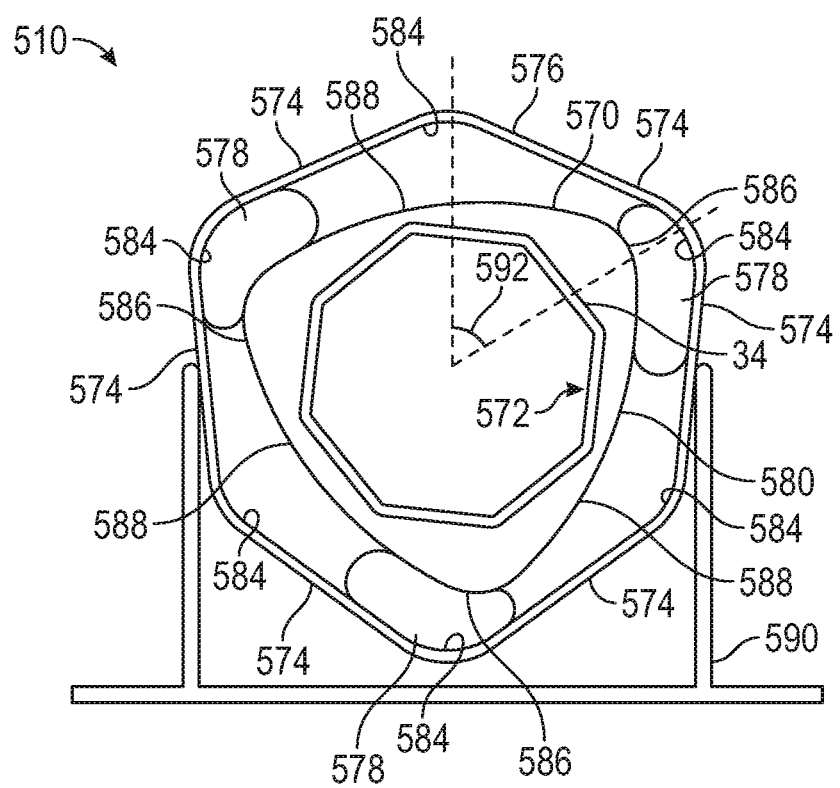
FIG. 20C is a front cross-sectional view of the spring counter-balance assembly of FIG. 20A shown in 52-degree rotation.
Figure 21:
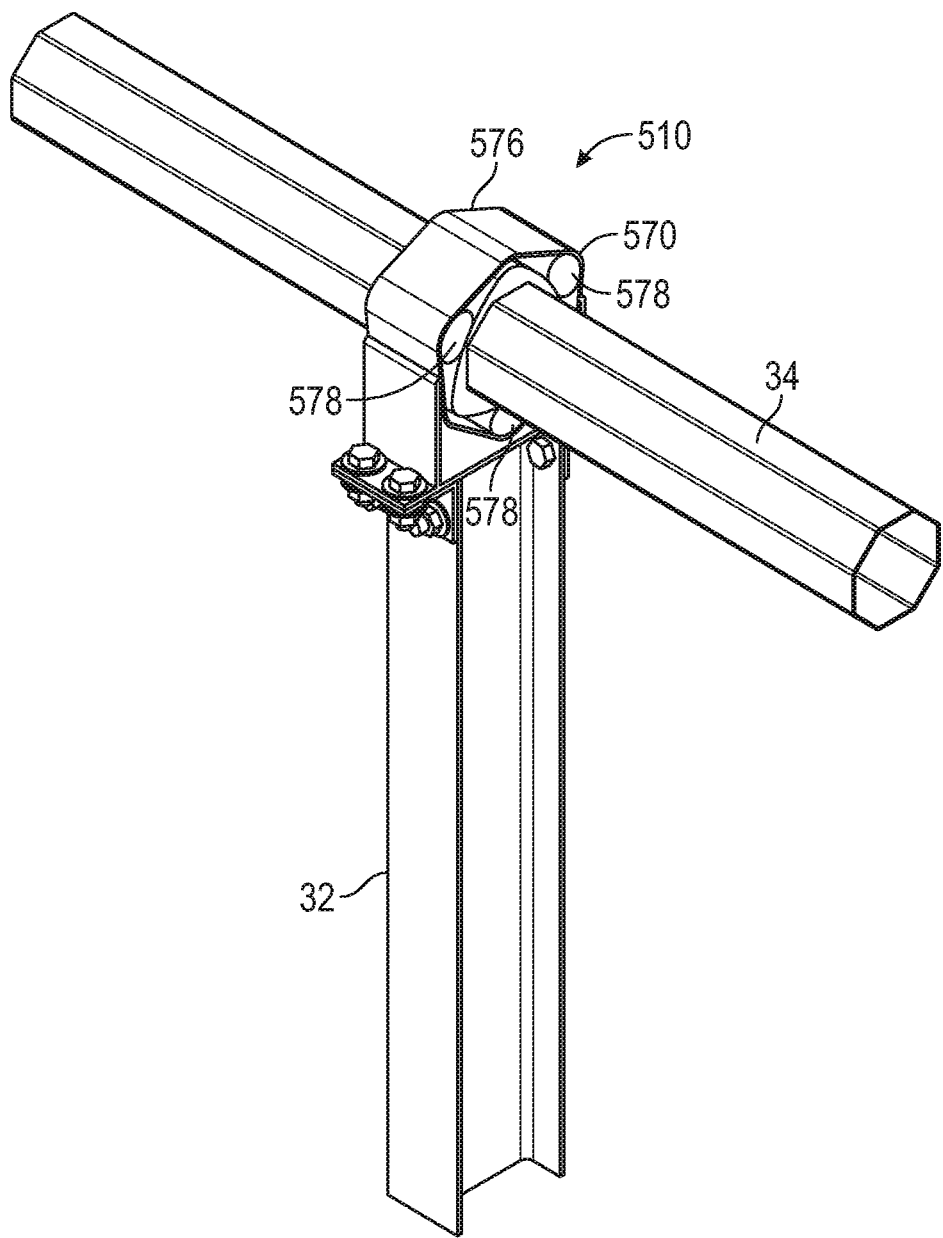
FIG. 21 is a perspective view of an exemplary embodiment of a spring counter-balance assembly in accordance with the present disclosure shown mounted on a torque tube or torsion beam.
Figure 22:
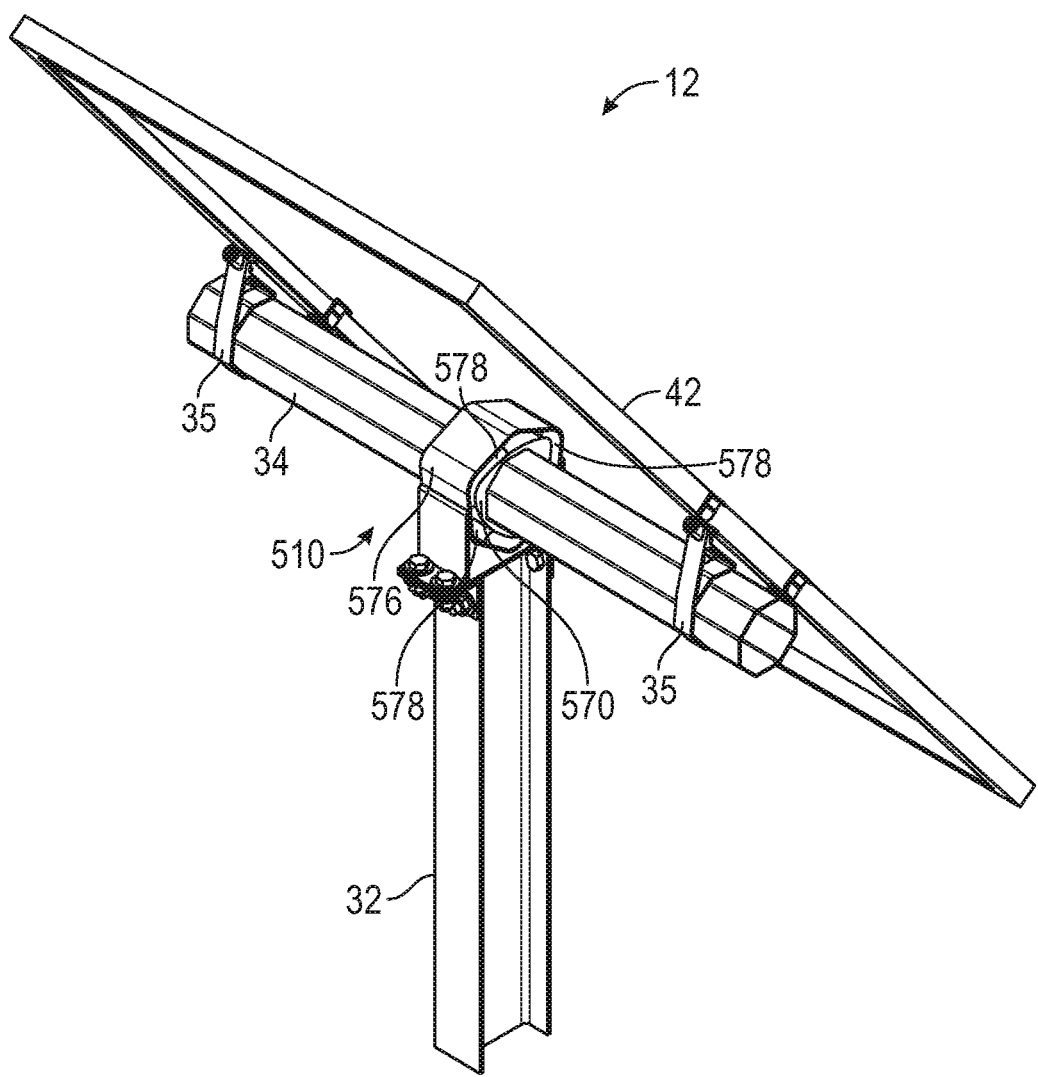
FIG. 22 is a perspective view of an exemplary embodiment of a spring counter-balance assembly in accordance with the present disclosure shown mounted on solar tracker assembly.
Figure 23A:
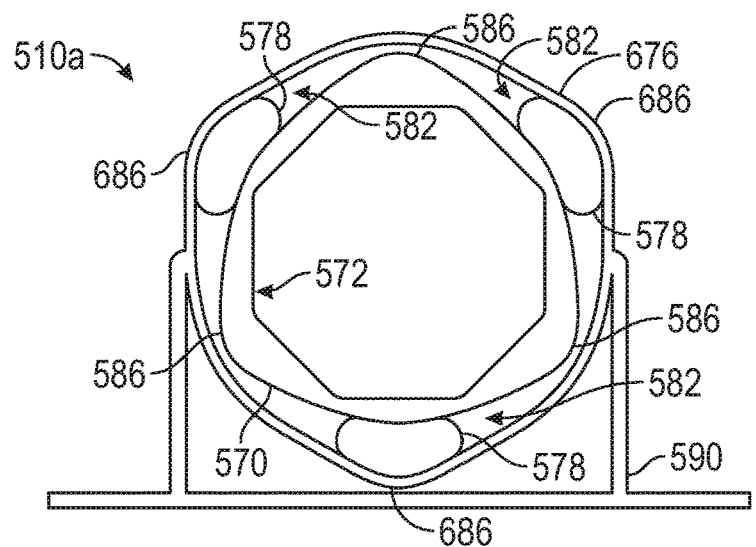
FIG. 23A is a front cross-section view of an exemplary embodiment of a spring counter-balance assembly in accordance with the present disclosure
Figure 23B:
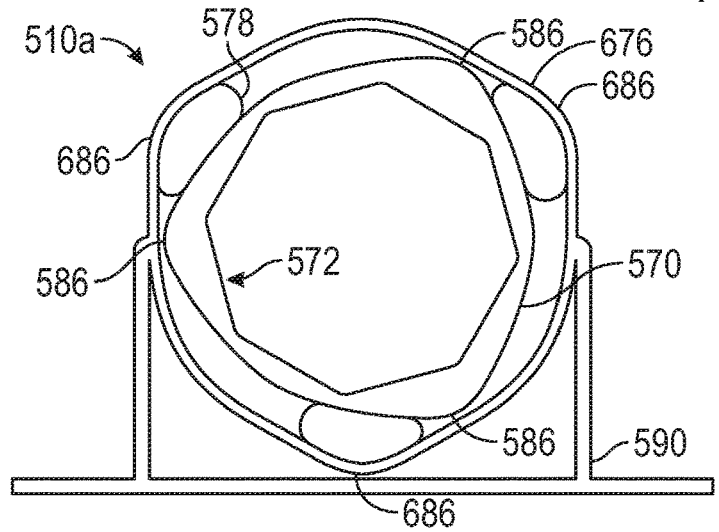
FIG. 23B is a front cross-sectional view of the spring counter-balance assembly of FIG. 23A shown in rotation.
Figure 23C:
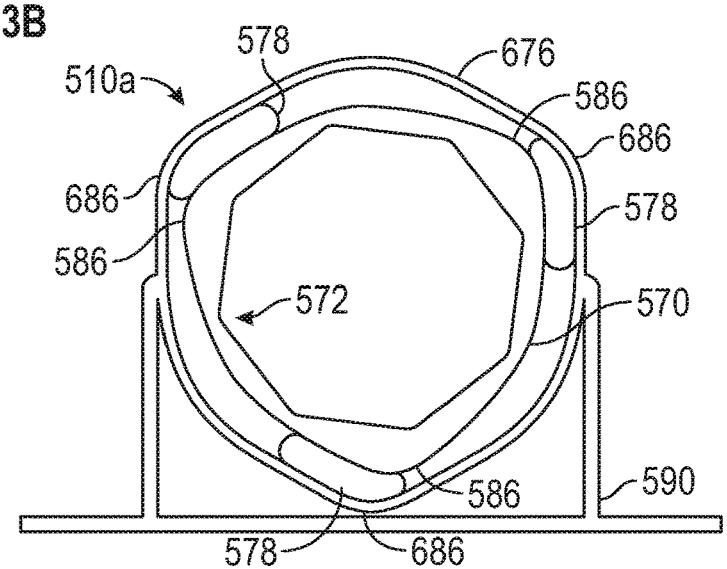
FIG. 23C is a front cross-sectional view of the spring counter-balance assembly of FIG. 23A shown in rotation.
Figure 24:
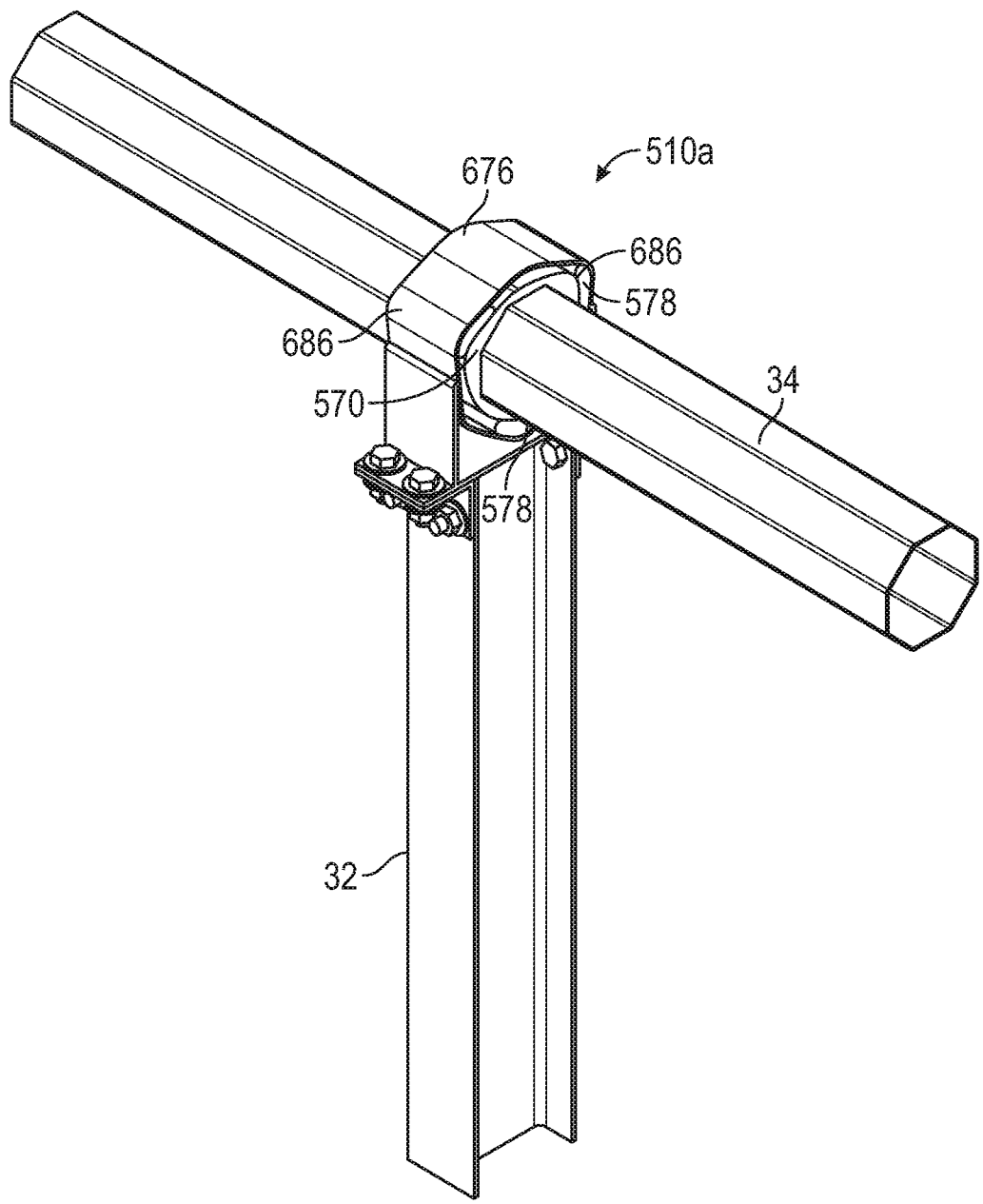
FIG. 24 is a perspective view of an exemplary embodiment of a spring counter-balance assembly in accordance with the present disclosure shown mounted on a torque tube or torsion beam.
Figure 25:
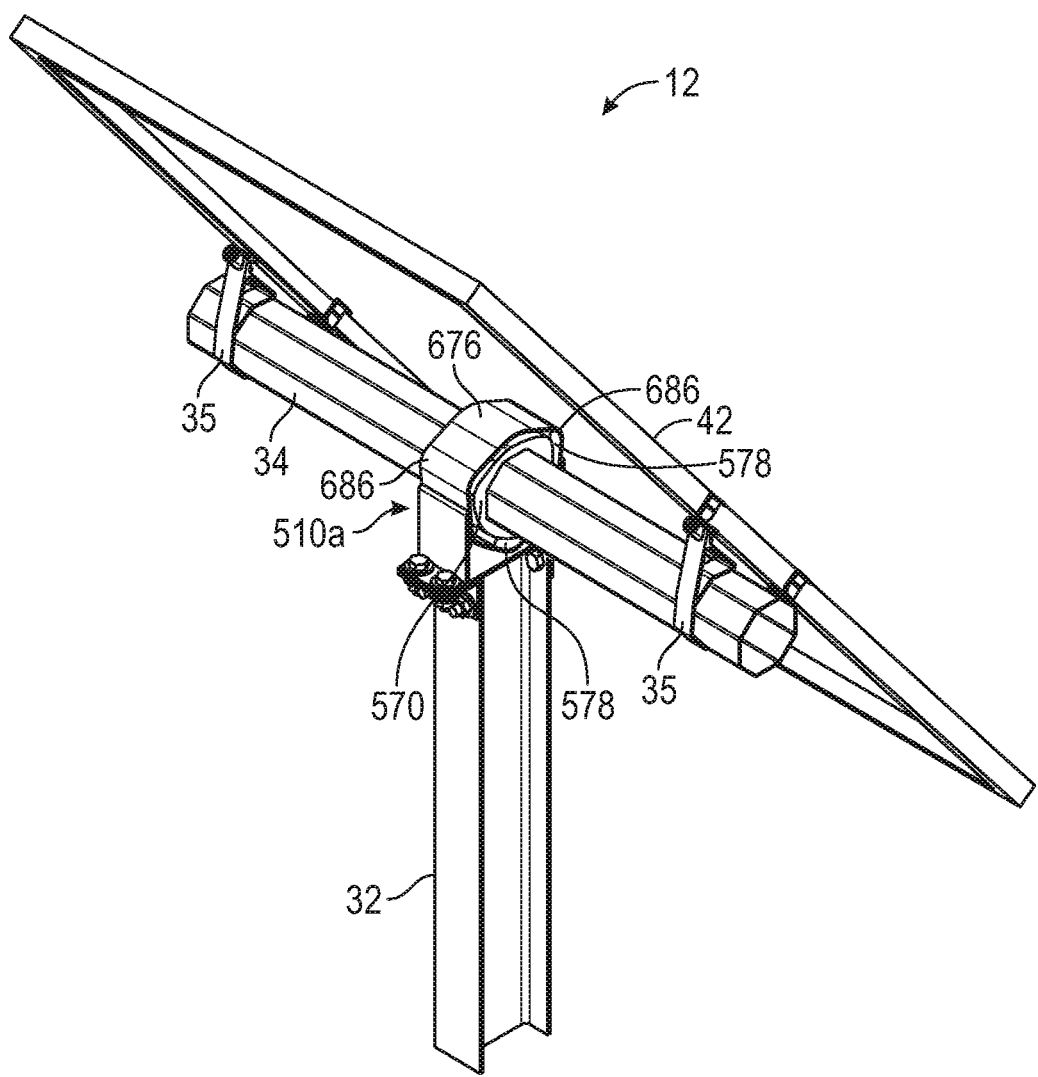
FIG. 25 is a perspective view of an exemplary embodiment of a spring counter-balance assembly in accordance with the present disclosure shown mounted on solar tracker assembly.

In exemplary embodiments, compressible cords 578 are situated between bushing 570 and bearing housing 576. In exemplary embodiments, there are three compressible cords 578, each compressible cord being located adjacent an internal angled corner 584 of the bearing housing 576. More particularly, as best seen in FIG. 20A, each compressible cord 578 is located in one of the three spaces 582 defined between the three flat sections 588 of the bushing 570 and the internal angled corner 584 of the bearing housing 576. Each compressible cord 578 is located in a space 582 such that the compressible cords are securely disposed between the bushing 570 and the bearing housing 576.

Spring counter-balance assembly 510 advantageously allows a large degree of rotation of a solar tracker 12, which can reach up to 126 degrees, or plus or minus at least 63 degrees. When the torque tube or torsion beam 34 of the solar tracker assembly 12 rotates, the bushing 570 rotates, the bearing housing 576 remains in a fixed position, and the damper cords 578 compress. More particularly, when the bushing 570 rotates about axis of rotation 592 and the lobed sections 586 of the bushing shift in position relative to the stationary bearing 576, each damper cord 578 is compressed between the inner wall and each angled corner 584 of the bearing 576 and the edge of a lobed section 586 of the bushing 570 as the space 582 diminishes in size due to the changed position of each rounded section 586. As the compressible cords 578 reach their maximum compressibility, they provide dampening because of the lack of hysteresis of the rubber material. Furthermore, as the compressible cords 578 reach their designed rotational limit, further rotation is possible but the resistance to rotation can be designed to increase dramatically as the rotation exceeds the limit value which will create a soft stop for the rotation of the system.

Exemplary embodiments of spring counter-balance assemblies described herein, when used in conjunction with torsion limiter designs of a solar tracker allow the torsion limiter to release the torsion purely as a function of the wind induced torque instead of a function of the wind plus the overhung weight induced torque in the system. This allows for more precise control over the torsion release and minimizes the velocity and damping necessary in the system since the overhung weight of the system is no longer applied to the torsion limiter and is not additive to the torsion force or resulting release velocity.

Exemplary embodiments of spring counter-balance assemblies used with a torsion limiter eliminate the need for dead spaces and increases the density and overall land use efficiency of the power plant. When used in conjunction with a torque limiter they enable the torque limiter to react more precisely and predictably because the position of the tracker and the variable of the overhung weight do not play a part in the torque applied to the limiter. They also reduce the velocity of the tracker system during torque release since the additive variable overhung weight do not add to the dynamic load once the torsion release is in motion. Exemplary designs reduce the impact load by counterbalancing the weight and may also create a soft stop when engaging the mechanical stops on the tracker bearings.

Torsion limiters, torque limiters, torsion limiting clutches, and solar trackers incorporating torsion and torque limiters are described in detail in U.S. Pat. No. 9,581,678, issued Feb. 28, 2017, which is hereby incorporated by reference in its entirety. An exemplary gear drive system comprises a torque limiting clutch and a gear assembly including at least one gear wheel. In exemplary embodiments, the gear drive system of the solar tracker incorporates a torque-limiting clutch on the first gear stage of the solar tracker. Exemplary embodiments could include a single-stage gear-driven solar tracker where the gear drive system is a single-stage worm gear drive that directly rotates the solar collector array. The gear assembly may include a one-way gearbox and the torque limiter may be a torque limiting clutch contained within the gearbox. The torque limiter, in the form of a clutch, could be located between the connection of the output of the worm gear drive and the solar collector array. Exemplary embodiments also include two- or multi-stage solar trackers. Gear assembly includes at least one gear wheel, and in exemplary embodiments the gear wheel is a worm wheel.

In exemplary embodiments, the torque limiting clutch is located between the connection of the output of the first stage worm gear and the second stage gear. The torque-limiting clutch may be located at an output of the gear assembly, on the output of the first gear stage of the solar tracker, and prior to a location where the gear drive system engages the gear rack of the solar tracker. The clutch may be located at two taper sections of the worm wheel gear. The two steel tapers engage the worm wheel gear under spring tension, which may be adjustable via a nut or other adjustment mechanism. Instead of a clutch, the torque limiter could be a motor brake located at the input of a bi-directional gearbox. The torque limiter could be a motor connected to an asymmetrical input/output bi-directional gearbox where the efficiency to drive the input of the gearbox is greater than the efficiency of the gearbox when driven from the output. The solar tracker may be a push/pull linked tracker and the torque limiter may be a linear slip device. The solar tracker may include a hydraulic system and the torque limiter may be a pressure relief valve. In exemplary embodiments, the torque limiting mechanism may be a bi-directional gear drive motor assembly that back-drives at a pre-determined torque.

In exemplary embodiments, the torque-limiting clutch may be incorporated into a plurality of solar trackers connected into an array layout comprised of one or more rows of solar trackers. In exemplary embodiments, one spring is connected to the torque tube or torsion beam at or near the first end of the tracker row, and another spring is connected to the torque tube or torsion beam at or near the second end of the row. As discussed above, each spring may be incorporated into a spring counter-balance assembly or into a damper or bearing housing assembly. The embodiments discussed above advantageously include less stress on the drive system of the tracker, less deflection in the torque tube or solar structure, less material needed in the torque tube or torsion beam if the torsional deflection is controlling the design, and enablement of the use of uncomplicated pivots and structure.

Thus, it is seen that spring counter-balance assemblies, systems, and methods incorporated into systems such as solar trackers are provided. While the systems, devices, and methods have been described in terms of exemplary embodiments, it is to be understood that the disclosure need not be limited to the disclosed embodiments. Although illustrative embodiments are described hereinabove, it will be evident to one skilled in the art that various changes and modifications may be made therein without departing from the disclosure.

It should be understood that any of the foregoing configurations and specialized components or chemical compounds may be interchangeably used with any of the systems of the preceding embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims. It is intended in the appended claims to cover all such changes and modifications that fall within the true spirit and scope of the disclosure.

What is claimed is:

1. A solar tracker assembly comprising:
   one or more support columns;
   at least one torque tube connected to the one or more support columns;
   a drive system connected to the torque tube; and
   a spring counter-balance assembly connected to the torque tube.

2. The solar tracker assembly of claim 1, the spring counter-balance assembly further comprising:
   a top bracket;
   a bottom bracket;
   a spring at least partially disposed between the top bracket and the bottom bracket; and
   a damper connected to the top bracket and the bottom bracket.

3. The solar tracker assembly of claim 2, wherein the spring is connected to the top bracket and the bottom bracket; and
   wherein the spring and the damper are disposed in a substantially parallel configuration.

4. The solar tracker assembly of claim 1, wherein the spring counter-balance assembly is connected to a support column of the one or more support columns.

5. The solar tracker assembly of claim 1, the spring counter-balance assembly further comprising:
   a housing;
   an inner layer disposed within the housing; and
   one or more springs disposed within the housing.

6. The solar tracker assembly of claim 5, wherein the inner layer includes one or more stops; and
   wherein the one or more springs are disposed between the one or more stops and the housing.

7. The solar tracker assembly of claim 5, wherein the one or more springs are coupled to the one or more stops and the housing; and
   wherein the one or more springs provide resistance to the rotation of the inner layer when the inner layer rotates.

8. The solar tracker assembly of claim 5, wherein the torque tube is connected to the inner layer.

9. The solar tracker assembly of claim 5, wherein the one or more springs are drawbar springs, extension springs, and/or leaf springs.

10. The solar tracker assembly of claim 1, the spring counter-balance assembly further comprising:
    a housing;
    an elastomer layer disposed within the housing; and
    an aperture disposed within the elastomer layer and the torque tube disposed within the aperture.

11. The solar tracker assembly of claim 10, wherein the elastomer layer comprises a radial elastic bushing.

12. The solar tracker assembly of claim 11, wherein the radial elastic bushing includes one or more air spaces.

13. The solar tracker assembly of claim 10, wherein the elastomer layer comprises a longitudinal torsion spring.

14. The solar tracker assembly of claim 10, further comprising:
    a coupler disposed within the housing, the coupler including one or more coupler stops; and
    one or more housing stops connected to the housing;
    wherein the coupler stops and the housing stops limit rotation of the coupler relative to the housing.

15. The solar tracker assembly of claim 1, the spring counter-balance assembly comprising:
    a bearing housing;
    a bushing disposed within the bearing housing, the bushing being configured to be slideably mounted onto the torque tube or torsion beam; and
    one or more compressible cords made of a flexible material, the compressible cords located between the bushing and the bearing housing.

16. The solar tracker assembly of claim 15, wherein the compressible cords provide damping during rotational movement of the solar tracker assembly.

17. The solar tracker assembly of claim 15, wherein the bushing has a substantially circular outer cross-section with four lobes.

18. The solar tracker assembly of claim 15, wherein the cross-section of the bearing housing is one of: substantially square shaped, substantially hexagonal shaped, or substantially circular shaped with at least three lobes.

19. The solar tracker assembly of claim 1, the spring counter-balance assembly further comprising:
    a bearing housing having one or more lobes;
    a bushing disposed within the bearing housing such that one or more spaces are defined between the bushing and the lobes; and
    one or more compressible cords made of a flexible material, the compressible cords disposed in the spaces between the bushing and the lobes.

20. The solar tracker assembly of claim 1, the spring counter-balance assembly further comprising:
    at least one top bracket and at least one bottom bracket;
    at least one spring having a first end and second end, the first end of the spring being attached to the top bracket and the second end of the spring being attached to the bottom bracket;
    a damper having a first end and a second end, the first end of the damper being attached to the top bracket and the second end of the damper being attached to the bottom bracket, the damper being positioned substantially parallel to the spring; and
    a bracket attached to the top bracket, the bracket being sized and shaped for a torque tube or torsion beam to be inserted through the bracket such that the spring counter-balance assembly can be incorporated into a solar tracker.

* * * * *